United States Patent [19]
Tanaka et al.

[11] Patent Number: 5,335,072
[45] Date of Patent: Aug. 2, 1994

[54] PHOTOGRAPHIC SYSTEM CAPABLE OF STORING INFORMATION ON PHOTOGRAPHED IMAGE DATA

[75] Inventors: Yoshito Tanaka; Dai Shintani, both of Sakai; Hirokazu Naruto, Higashiosaka; Katsuyuki Nanba, Sakai; Nobuyuki Taniguchi, Nishinomiya; Hiroshi Ishibe, Kyoto; Yoshihiro Tanaka, Osaka, all of Japan

[73] Assignee: Minolta Camera Kabushiki Kaisha, Osaka, Japan

[21] Appl. No.: 29,991

[22] Filed: Mar. 12, 1993

Related U.S. Application Data

[63] Continuation of Ser. No. 708,068, May 30, 1991.

[30] Foreign Application Priority Data

| | | | |
|---|---|---|---|
| May 30, 1990 | [JP] | Japan | 2-142400 |
| Jul. 11, 1990 | [JP] | Japan | 2-184751 |
| Jul. 11, 1990 | [JP] | Japan | 2-184752 |
| Jul. 11, 1990 | [JP] | Japan | 2-184753 |
| Jul. 11, 1990 | [JP] | Japan | 2-184754 |
| Jul. 11, 1990 | [JP] | Japan | 2-184755 |
| Jul. 11, 1990 | [JP] | Japan | 2-184756 |
| Jul. 11, 1990 | [JP] | Japan | 2-184757 |
| Jul. 11, 1990 | [JP] | Japan | 2-184758 |
| Jul. 11, 1990 | [JP] | Japan | 2-184759 |
| Jul. 11, 1990 | [JP] | Japan | 2-184760 |
| Jul. 11, 1990 | [JP] | Japan | 2-184761 |
| Jul. 11, 1990 | [JP] | Japan | 2-184762 |
| Jul. 11, 1990 | [JP] | Japan | 2-184763 |
| Jul. 11, 1990 | [JP] | Japan | 2-184764 |
| Jul. 11, 1990 | [JP] | Japan | 2-184765 |
| Jul. 11, 1990 | [JP] | Japan | 2-184766 |
| Jul. 11, 1990 | [JP] | Japan | 2-184767 |

[51] Int. Cl.⁵ ............................... H04N 5/225
[52] U.S. Cl. ...................... 348/232; 358/906; 358/909.1; 354/412; 348/233
[58] Field of Search ............... 358/909, 228, 227, 209, 358/335; 354/412, 430, 109

[56] References Cited

U.S. PATENT DOCUMENTS

| | | | |
|---|---|---|---|
| 4,041,308 | 8/1977 | Fujita | 354/430 |
| 4,258,993 | 3/1981 | Frank | 354/410 |
| 4,443,077 | 4/1984 | Tanikawa | 354/21 |
| 4,686,474 | 8/1987 | Olsen et al. | 358/109 |

(List continued on next page.)

FOREIGN PATENT DOCUMENTS 58-158507 9/1983 Japan .

(List continued on next page.)

OTHER PUBLICATIONS

Manual for Toshiba's Digital Still Video Camera System.
Manual for Fuji's Memory Card Camera.

*Primary Examiner*—Joseph Mancuso
*Assistant Examiner*—Wendy R. Greening
*Attorney, Agent, or Firm*—Willian Brinks Hofer Gilson & Lione

[57] ABSTRACT

A photographic system includes a photographing device for photographing subjects to generate respective image data of the subjects, the photographing device having an image information production device for producing image information concerning the photography for each of the subjects, and a storage device for storing the produced image information, and a reproduction device for reproducing the image data, the reproduction device having a retrieval condition input device for inputting a retrieval condition, a retrieval device responsive to the retrieval condition input device for retrieving image data having a connection with the input retrieval condition by inference, and a reproducing device for reproducing the retrieved image data.

38 Claims, 31 Drawing Sheets

U.S. PATENT DOCUMENTS

| | | | |
|---|---|---|---|
| 4,709,265 | 11/1987 | Silverman et al. | 358/108 |
| 4,727,417 | 2/1988 | Kanno et al. | 358/909 |
| 4,739,409 | 4/1988 | Baumeister | 358/228 |
| 4,800,577 | 1/1989 | Tachita et al. | 375/115 |
| 4,802,018 | 1/1989 | Tanikawa et al. | 358/909 |
| 4,837,628 | 6/1989 | Sasaki | 358/209 |
| 4,847,862 | 7/1989 | Braicted et al. | 375/1 |
| 4,888,648 | 12/1989 | Takeuchi et al. | 358/335 |
| 4,914,746 | 4/1990 | Nishi et al. | 358/334 |
| 4,931,878 | 6/1990 | Takei et al. | 358/909 |
| 4,991,944 | 2/1991 | Hirao et al. | 358/227 |
| 5,027,149 | 6/1991 | Hoshino et al. | 354/412 |
| 5,027,214 | 6/1991 | Fujimori | 358/909 |
| 5,045,937 | 9/1991 | Myrick | 358/109 |
| 5,062,010 | 10/1991 | Saito | 358/909 |
| 5,086,314 | 2/1992 | Aoki et al. | 354/412 |
| 5,177,645 | 1/1993 | Lemelson | 358/335 |

FOREIGN PATENT DOCUMENTS

| | | |
|---|---|---|
| 58-159079 | 9/1983 | Japan . |
| 60-145428 | 9/1985 | Japan . |
| 62-885 | 1/1987 | Japan . |
| 62-256583 | 11/1987 | Japan . |
| 62-259004 | 11/1987 | Japan . |
| 63-187176 | 8/1988 | Japan . |
| 1-17583 | 1/1989 | Japan . |
| 1-114898 | 5/1989 | Japan . |
| 1-185088 | 7/1989 | Japan . |
| 1-193928 | 8/1989 | Japan . |
| 1-218188 | 8/1989 | Japan . |
| 1-237961 | 9/1989 | Japan . |
| 1-279494 | 11/1989 | Japan . |
| 1-288186 | 11/1989 | Japan . |
| 1-289948 | 11/1989 | Japan . |
| 2-149834 | 6/1990 | Japan . |
| WO90/04302 | 4/1990 | PCT Int'l Appl. . |

FIG.25

| 1. 89/12/10 | 10:10 | Mt. FUJI | VOICE ON |
| | | | Mr. TANAKA |
| 2. 89/12/10 | 11:00 | Mt. FUJI | VOICE ON |
| | | | Ms. SHINTANI |
| 3. 89/12/10 | 11:01 | Mt. FUJI | VOICE ON |
| | | | male |

. . . .

| CHRONO. ORDER | MULTI DISPLAY | ALL FILING | | |

FIG.26

| DATE | TIME | PLACE | SPEAKER | WEATHER | | OTHER |
|------|------|-------|---------|---------|---|-------|
| SUMMER | EVENING | Expo '90 | KATSUYUKI NANBA | | | |

| RETRY | ONE DISPLAY | MULTI DISPLAY | EXECUTION | |

PHOTOGRAPHIC SYSTEM CAPABLE OF STORING INFORMATION ON PHOTOGRAPHED IMAGE DATA

This application is a continuation of application Ser. No. 07/708,068, filed May 30, 1991.

BACKGROUND OF THE INVENTION AND RELATED ART STATEMENT

This invention relates to a photographic system in which image information concerning photographed image data can be stored and the stored image information can be used for image retrieval.

Conventionally there has been known a camera in which photography date can be recorded within an image frame of the film together with a photographed image. In such a camera, the photography date can be seen when the photographed image is printed.

Japanese Unexamined Patent Publication No. 62-256583 discloses a photographic system including a camera and a reproduction device. In this system, frame numbers are recorded in order in a memory carried by the camera when recording photographed images. In image reproduction, a desired image data is retrieved and reproduced based on the orderly alloted frame numbers.

Generally speaking, desired images are retrieved with remembering the photography situations, for example, remembering who was photographed, where the photography was practiced, what season the photography was practiced in, or the like.

In the conventional camera in which photography date is recorded within an image frame, the photography date can be seen, but a desired image cannot be retrieved based on the recorded photography date. That is, the recorded photography dates cannot be used for retrieval.

Also, in the system in which frame numbers are recorded in chronological order, a desired image can be retrieved only when the frame number for the image can be remembered. However, it will be apparent that it is very difficult or almost impossible to remember the photography order having no connection with the recorded subjects.

In view of the above-mentioned drawbacks, it is an object of the present invention to provide a photographic system which makes it possible to easily retrieve and reproduce a desired image with an increased number of items and conditions.

Also, it is another object of the present invention to provide a photographic system which makes it possible to record an increased number of image information concerning photographed image data.

SUMMARY OF THE INVENTION

Accordingly, a photographic system of the present invention comprises a camera including photographing means for photographing subjects to generate respective image data of the subjects, first storage means for storing the generated image data, image information production means for producing image information concerning each of the image data, and second storage means for storing the produced image information, and a reproduction device for reproducing the image data including retrieval condition input means for inputting a retrieval condition, retrieval means responsive to the retrieval condition input means for retrieving the image data having the image information corresponding to the input retrieval condition, and reproducing means for reproducing the retrieved image data.

Also, a photographic system of the present invention comprises a camera including photographing means for photographing subjects to generate respective image data of the subjects, first storage means for storing the generated image data, image information production means for producing image information concerning the state of the photographing means in which each of the subjects is photographed, and second storage means for storing the produced image information, and a reproduction device for reproducing the image data including retrieval condition input means for inputting a retrieval condition, retrieval means responsive to the retrieval condition input means for retrieving the image data having the image information corresponding to the input retrieval condition, and reproducing means for reproducing the retrieved image data.

Further, a photographic system of the present invention comprises a camera including photographing means for photographing subjects to generate respective image data of the subjects, first storage means for storing the generated image data, image information production means for producing image information concerning the photographing state of photographing each of the subjects, and second storage means for storing the produced image information, and a reproduction device for reproducing the image data including retrieval condition input means for inputting a retrieval condition, retrieval means responsive to the retrieval condition input means for retrieving the image data having the image information corresponding to the input retrieval condition, and reproducing means for reproducing the retrieved image data.

Further, a photographic system of the present invention comprises a camera including photographing means for photographing subjects to generate respective image data of the subjects, first storage means for storing the generated image data, image information production means for producing image information concerning the photographing condition of photographing each of the subjects, and second storage means for storing the produced image information, and a reproduction device for reproducing the image data including, retrieval condition input means for inputting a retrieval condition, retrieval means responsive to the retrieval condition input means for retrieving the image data having the image information corresponding to the input retrieval condition, and reproducing means for reproducing the retrieved image data.

Further, a photographic system of the present invention comprises a photographing device for photographing subjects to generate respective image data of the subjects, the photographing device including image information production means for producing image information concerning the photography for each of the subjects, and storage means for storing the produced image information, and a reproduction device for reproducing the image data, the reproduction device including retrieval condition input means for inputting a retrieval condition, retrieval means responsive to the retrieval condition input means for retrieving image data having a connection with the input retrieval condition by inference, and reproducing means for reproducing the retrieved image data.

These and other objects, features and advantages of the present invention will become more apparent upon a reading of the following detailed description and drawings.

BRIEF DESCRIPTION OF THE DRAWINGS

FIG. 25 is a diagram showing a display image concerning contents of recorded image data;

FIG. 26 is a diagram showing a display image concerning retrieval items;

DETAILED DESCRIPTION OF PREFERRED EMBODIMENTS OF THE INVENTION

Figure 1A:
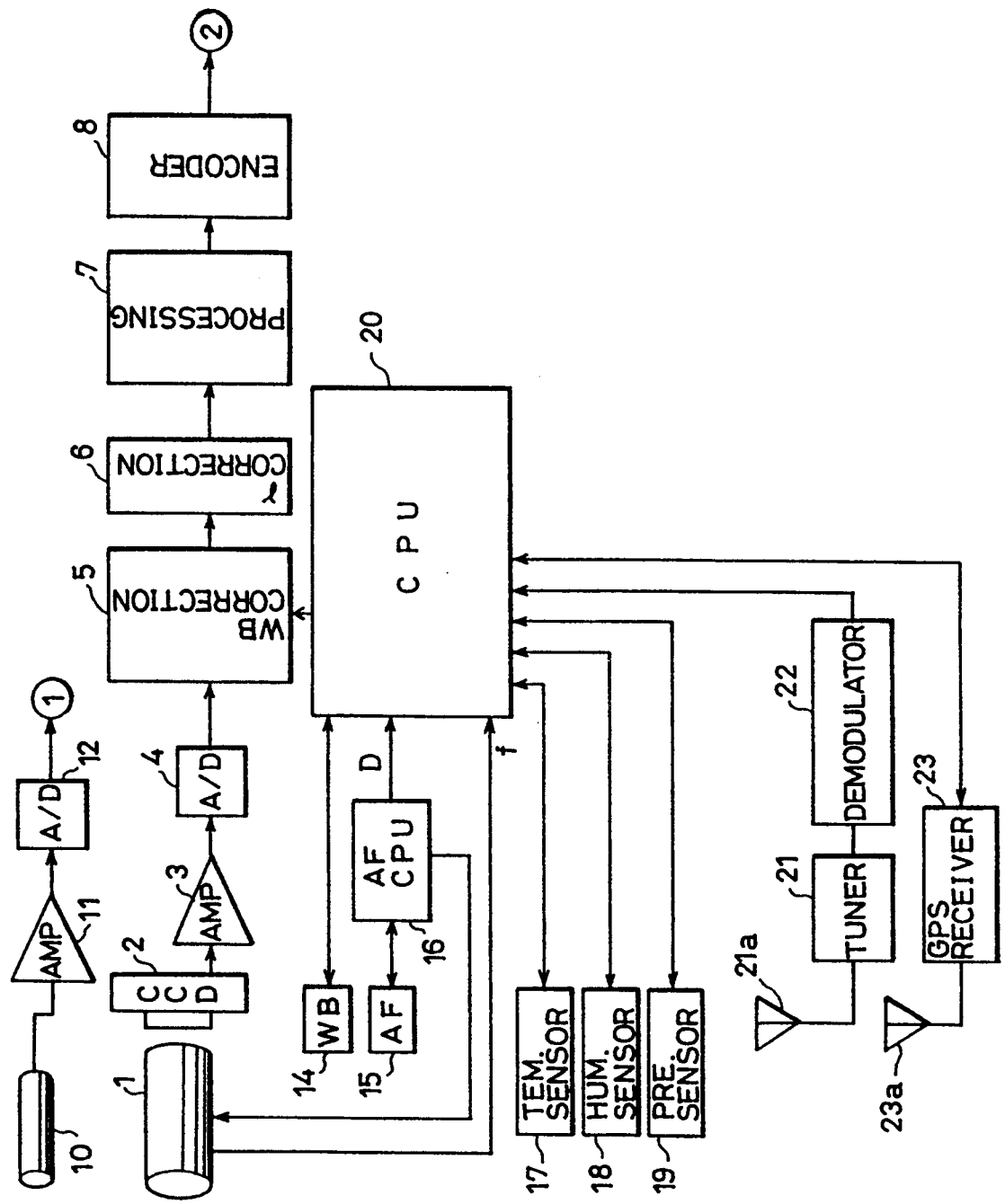
FIGS. 1A and 1B are block diagrams combinedly showing an overall construction of a camera of a photographic system embodying the present invention.
Figure 1B:
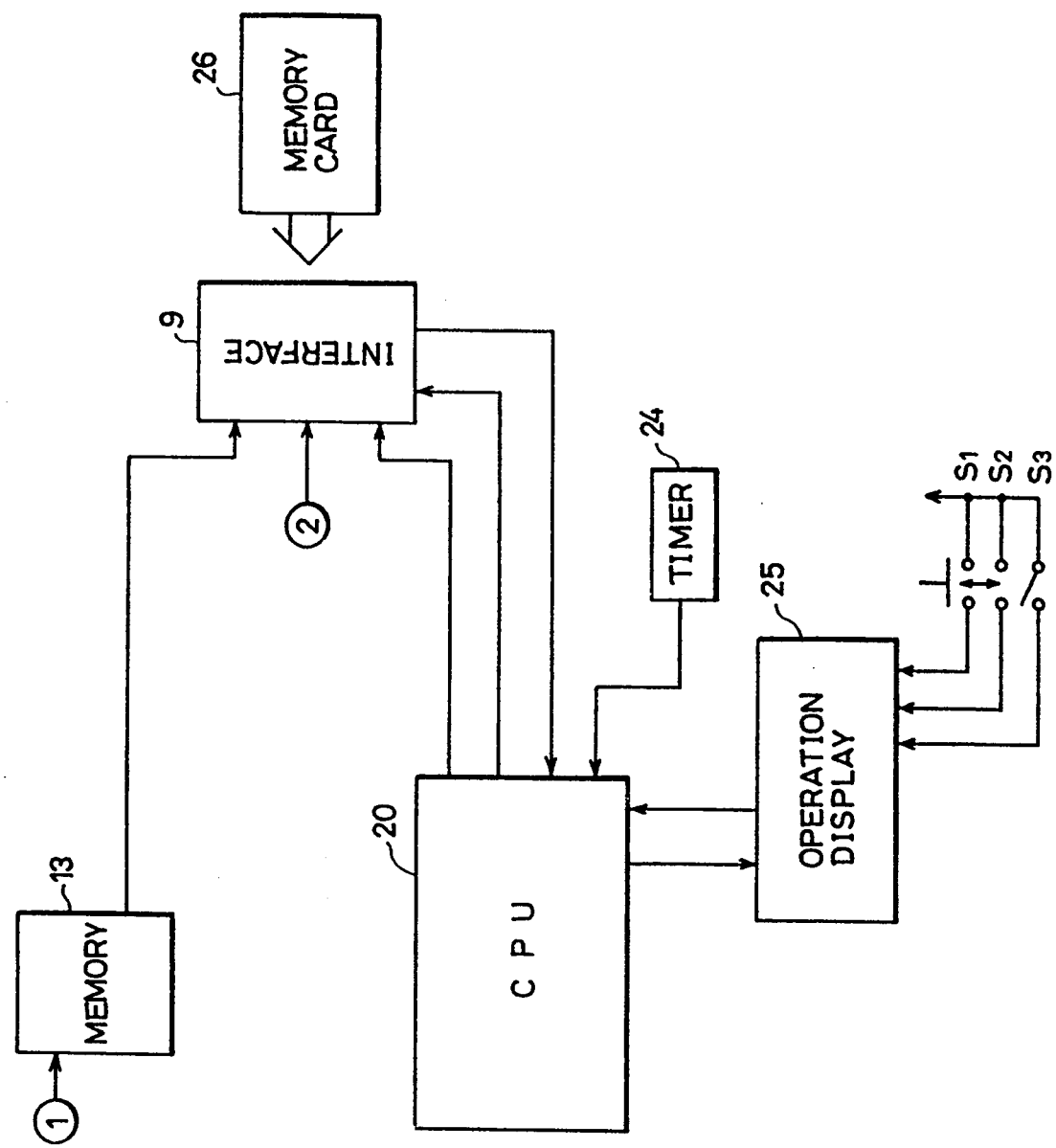

FIGS. 1A and 1B are block diagrams combinedly showing an overall construction of a camera of a photographic system embodying the present invention. Indicated at 1 is a lens. Indicated at 2 is a CCD disposed on an optical axis of the lens 1 and behind the lens 1, and adapted for picking up an image of a subject through the lens 1. Indicated at 3 is an amplifier for amplifying an analog image signal sent from the CCD 2 at a predetermined amplitude and outputting the amplified image signal to an analog/digital converter 4 (hereinafter referred to as A/D converter.) The AD converter 4 is adapted for converting the analog image signal into a digital image signal. Indicated at 5 is a white-balance (hereinafter referred to as WB) correction circuit for performing a WB correction to the digital image data in accordance with color temperature data received from a WB sensor 14. Indicated at 6 is gamma correction circuit for performing gamma correction further to the image signal sent from the WB correction circuit 5. Indicated at 7 is a matrix processing circuit for applying an appropriate gradation to the digtal image signal. Indicated at 8 is an encoder for converting the digital image signal to a NTSC signal for image reproduction and sending the NTSC signal to an interface 9 for memory card.

A microphone 10 is disposed in an appropriate position of a camera body for picking up voices of an photographer, persons to be photographed and other voices. Indicated at 11 is an amplifier for amplifying an analog voice signal from the microphone 10 at a predetermined amplitude and sending the amplified signal to an A/D converter 12, The A/D converter 12 is adapted for converting the analog voice signal into a digital voice signal. Indicated at 13 is a memory 13 for speaker recognition and adapted for recording the digital voice data and then sending it to the interface 9.

Next, there will be described a construction for picking up various other informations.

The WB sensor 14 is adapted for detecting color temperature of a light source illuminating a subject. Based on the detected color temperature, it is discriminated whether photography is practiced under fluorescent light or sun light so that an appropriate WB correction is performed in the WB correction circuit 5. Indicated at 15 is an auto focus sensor (hereinafter referred to as AF sensor) for calculating distance to a subject by a known distance measuring method.

For example, light is directed to a subject from the camera. The distance to the subject is calculated based on an incidence angle of light reflected from the subject. Alternatively, a couple of optical images of a subject transmitted through the lens 1 are separated by a separator lens and introduced to two separated receptors (not shown.) The separated optical images received by the receptors are then sent to an AFCPU 16. The AFCPU 16 has following functions. The AFCPU 16 calculates a phase difference between the respective seperated optical images received by the two receptors and calculates a defocus amount and then calculates the distance to the subject based on defocus amount and the present position of the lens 1. Also, the AFCPU 16 controls the lens driving device (not shown) so as to focus the lens 1 in accordance with the calculated distance data or the calculated defocus amount. When the focusing of the lens 1 is completed, a focal length data f of the lens 1 and the subject distance data D are sent from the AFCPU 16 to a control unit 20 (hereinafter referred to as a CPU 20) to be described below.

Indicated at 17 is a temperature sensor, at 18 a humidity sensor, at 19 is an atmospheric pressure sensor and adapted for measuring the temperature, humidity, atmospheric pressure respectively under which the photography is practiced. The measured respective data are sent to the CPU 20. The above three sensors are so constructed as to measure automatically each data under which the photography is practiced and send the data to the CPU 20.

An FM signal receiving tuner unit 21, an FM signal demodulator unit 22, and a global positioning system (hereinafter referred to as GPS) signal receiving unit 23 constitute a construction for obtaining positional information. The FM signal receiving tuner unit 21 is adapted for receiving frequency-modulated (hereinafter referred to as FM) signals carrying a code regarding a place (hereinafter referred to as a place code. ) The place code is received through an antenna 21a. The place code is a code representative of an area, a sight spot, an event site or the like. The FM signal demodulator unit 22 is adapted for demodulating the received FM signal to recover the place code and sending the demodulated signal to the CPU 20. A detailed description of the FM signal demodulator unit 22 will be made with reference to FIGS. 2A and 2B. The GPS signal receiving unit 23 is adapted for receiving a signal transmitted from a satellite (not shown) through an antenna 23a, calculating latitude, longitude, and altitude of the present position of the camera or the photographer and sending the calculated results to the CPU 20. A detailed description of the GPS signal receiving unit 23 will be made with reference to FIG. 3.

A clock 24 is provided in the camera main body for measuring time.

Operation and control of the camera are carried out by the CPU 20 and an operation and display portion 25 for determining whether switches S1, S2, and S3 are turned on or off and sending the state of the switches S1, S2, and S3 to the CPU 20.

The CPU 20 is a microcomputer for centrally controlling the operation of each element of the camera. The switch S1 is a photography ready switch for starting each of the above-mentioned sensors. The switch S2 is an exposure start switch responsive to a so-called release button, for starting the exposure operation of the camera. It is preferable that the photography ready switch S1 be actuated when the release botton is pressed halfway and the exposure start switch Sz be actuated when pressed all the way. The switch S3 is a voice recording switch for starting recordation of the voice data. Also, the operation and display portion 25 is adapted for informing the CPU 20 of changeover of the switches S1, S2, and S3, and displaying various data from the CPU 20 required for the photographing operation, such as a frame number, according to needs.

Further, the interface 9 is controlled by the CPU 20 so as to record the image data, the voice data, and various image information to a memory card 26 detachably mounted to the camera main body including a SRAM or a EEPROM. The interface 9 also sends storage conditions of the memory card 26, such as availability of memory capacity, to the CPU 20.

The various kinds of image information recorded in the memory card 26 is used as retrieval information at the time of filing images as described below.

Figures 2A, 2B:
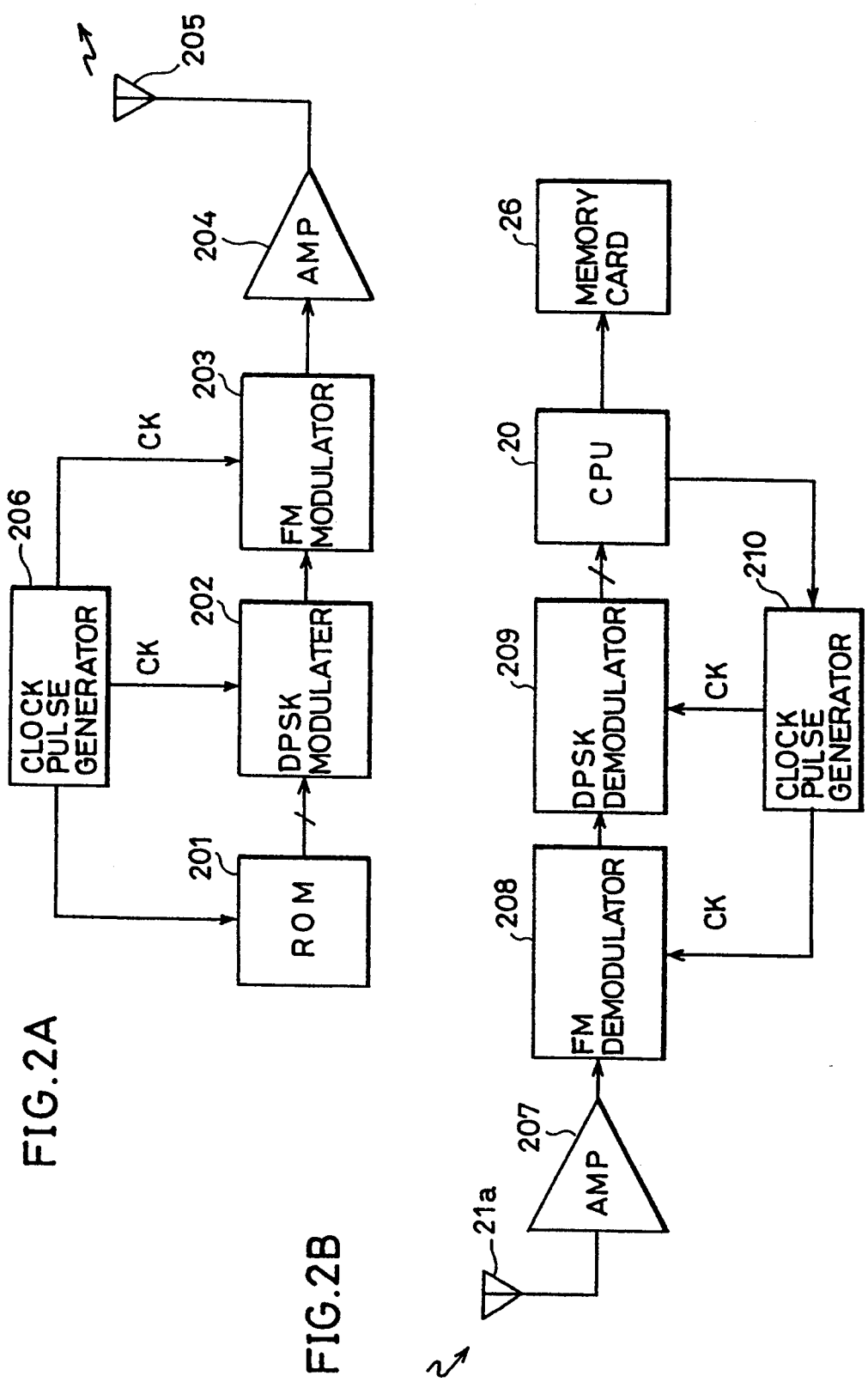
FIG. 2A is a block diagram showing a construction of a place code signal transmitting unit to be provided in a photographing site.
FIG. 2B is a block diagram showing a construction of a place code signal receiving unit to be provided in the camera.

FIG. 2A is a diagram showing a place code signal transmitting unit installed in each area, sight spot, event site for transmitting a place code signal. FIG. 2B is a diagram showing a place code signal receiving unit provided in the camera main body for receiving the place code signal.

In FIG. 2A, indicated at 201 is a ROM in which place codes are prewritten. For example, either place discrimination codes or character codes representative of place names, e.g., Japanese letter codes specified by Japanese Industrial Standards, may be prewritten in the ROM, or both of the above two codes may be prewitten. Indicated at 202 is a Differential Phase Shift Keying (hereinafter referred to as DPSK) modulator for performing a DPSK modulation to a carrier in accordance with the code data sent from the ROM 201. Indicated at 203 is a FM modulator for performing a FM modulation to the carrier in accordance with inputted serial data. Indicated at 204 is an amplifier for amplifying the modulated carrier at an appropriate amplitude. Indicated at 205 is an antenna for transmitting an FM signal carrying the place code. Indicated at 206 is a clock pulse generating circuit for generating clock pulses to control the timing of each block in the place code signal transmitting unit. The clock pulse generating 206 sends a read out address data to the ROM 201 and clock pulses to the DPSK modulator 202 and the FM modulator 203.

The DPSK modulator 202 provides serial data by extracting differential phase data from the digital data by the use of clock pulses from the clock pulse generating circuit 206 in accordance with an AFM, MFM, or RLL modulation.

In FIG. 2B, indicated at 21a is an antenna 21a for receiving the signal transmitted from the antenna 205 of the place code signal transmitting unit. The received signal carries the place code. The received signal is amplified in an amplifier 207 and then sent to an FM demodulator 208. In the FM demodulator 208, the carrier frequency is removed from the signal. The FM demodulated signal is sent to a DPSK demodulator 209 where the signal is demodulated to recover the original code data. The CPU 20 picks up the demodulated signal, and then allows it to be recorded in the memory card 26. The CPU 20 controls the recording of the place code data in the memory card 26 so as to correspond to the recording of the image data obtained at the place. Indicated at 210 is another clock pulse generating for generating clock pulses to control the timing of each block in the place code signal receiving unit. The clock pulse generating circuit 210 sends a clock pulse Ck to the FM demodulator 208 and the DPSK demodulator 209 in accordance with a control signal from t he CPU 20.

Accordingly, in a place where the place code signal transmitting unit is installed, such as certain area, sight spot, or event site, when the photography is practiced, the place code is automatically recorded in the memory card.

In addition, the above ROM 201 may record only a place code peculiar to a certain place. Alternatively, the ROM 201 may record a plurality of place codes to enable a place code suited for the installation site to be selected.

Figure 3:
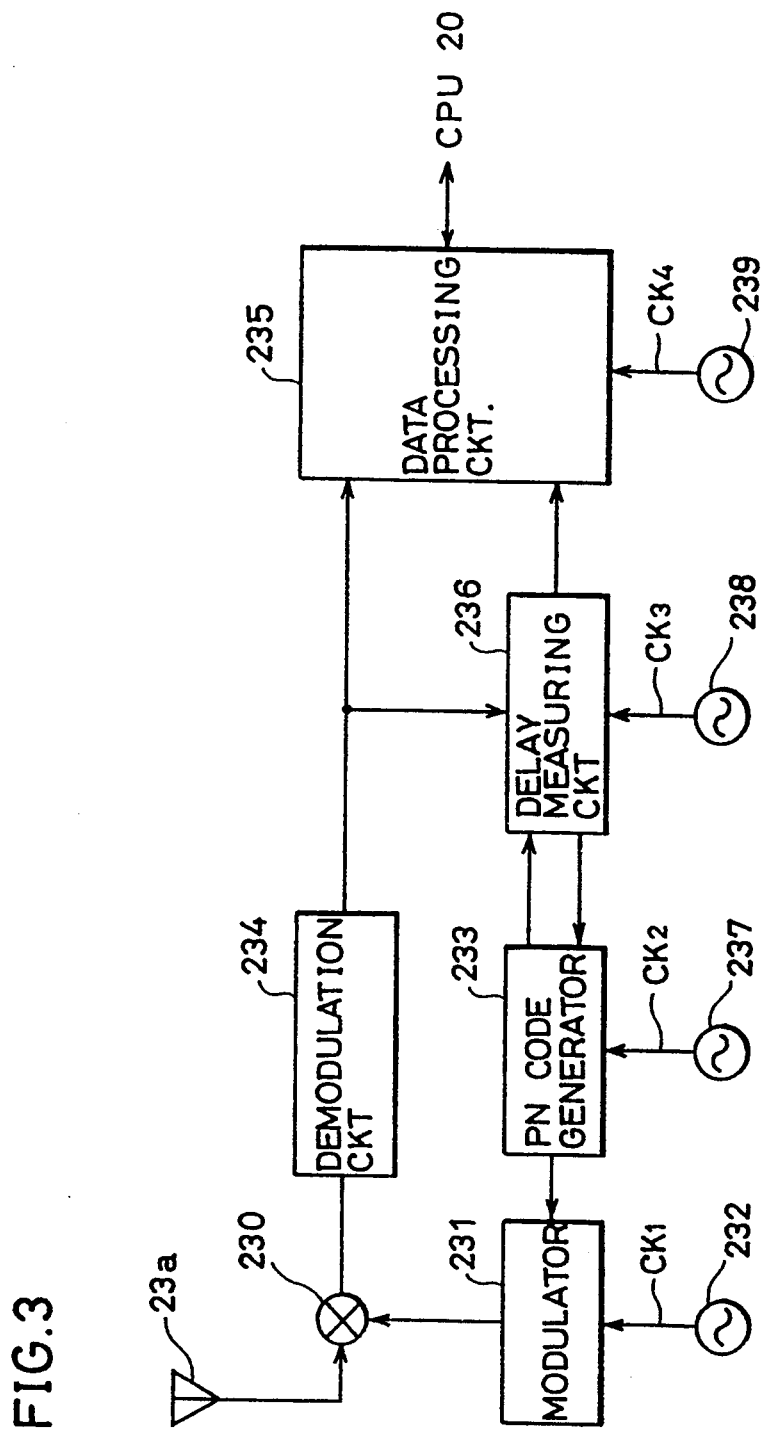
FIG. 3 is a block diagram showing a construction of a GPS signal receiving unit.

FIG. 3 is a detailed diagram showing the GPS signal receiving unit 23.

An antenna 23a is of quadrifilar helix type which receives a radio frequency (hereinafter referred to as RF) signal transmitted from each of NAVASTAR satellites (not shown.) The RF signal received through the antenna 23a is sent to a mixer 230. Indicated at 231 is a modulator, at 232 a local oscillator, at 233 a pseudo random noise (hereinafter referred to as PN) code generator, at 234 a demodulation circuit, at 235 a data processing circuit, and at 236 a delay measuring circuit. The modulator 231 is adapted for diffusing a local oscillating signal $Ck_1$ from the local oscillator 232 with the use of a PN code signal from the PN code generator 233. Subsequently, the resultant signal is transferred to the mixer 230. Thereby, the RF signal is converted into an intermediate frequency signal (hereinafter referred to as IF signal), then sent to the demodulation circuit 234. The demodulation circuit 234 is adapted for demodulating the IF signal to recover the data carrying the time when the satellite transmitted the RF signal and other information. The recovered data is transferred to the data processing circuit 235 and the delay measuring circuit 236.

Upon receiving the recovered data, the delay measuring circuit 236 sends a timing signal to the PN code generator 233. The PN code generator 233 always generates a PN code in accordance with a clock pulse $CK_2$ from a clock generator 237. Upon receiving the timing signal, the PN code generator 233 transmits the PN code to the delay measuring circuit 236. Also, the PN code from the demodulation circuit 234 is transmitted to the delay measuring circuit 236 where a delay period for the PN codes required for correlating the two PN codes to each other is measured. The delay period for the PN codes is measured by counting high frequency clock pulses $Ck_3$ from a clock pulse generator 238. The counted value is sent from the delay measuring circuit 236 to the data processing circuit 235 as a delay data required for correlating the two PN codes to each other.

The data processing circuit 235 comprising a micro processor is operated in accordance with a clock pulse $CK_4$ from a clock pulse generator 239. The data processing circuit 235 calculates a transmission time from the satellite to the GPS signal receiving unit 23 provided in the camera based on the transmitting time data included in the demodulated data from the demodulation circuit 234 and the receiving time data obtained by a cesium steam atomic clock or rubidium steam atomic clock (not shown) incorporated in the GPS signal receiving unit 23. Based on the calculated time is calculated the distance between the satellite and the camera. Subsequently, the data processing circuit 235 calculates the distance between another satellite and the camera. Consequently, the data processing circuit 235 calculates the positional information including latitude, longitude, and altitude of a position where the camera stands or the photographer stands based on the calculated distances and respective positional information of the satellites included in the recovered data, and sends the calculated positional information to the CPU 20.

The GPS is known to be a system covering the entire world with the aid of eighteen NAVASTAR satellites. However, at present not all 18 satellites are yet sent up in orbit. Accordingly, there are some areas where it is impossible to receive the GPS signals from satellites 24 hours a day, or at least at certain times of the day. In such areas, the CPU 20 allows the place code data from the aforementioned place code receiving unit to be automatically recorded in the memory card 26. On the other hand, when the place code signal cannot be received due to the fact that the place code signal transmitting unit is not installed in the photographing area, the CPU 20 allows the positional information obtained from GPS signals to be recorded in the memory card 26. In these ways, the disadvantages can be offset by each other.

Figure 4A:
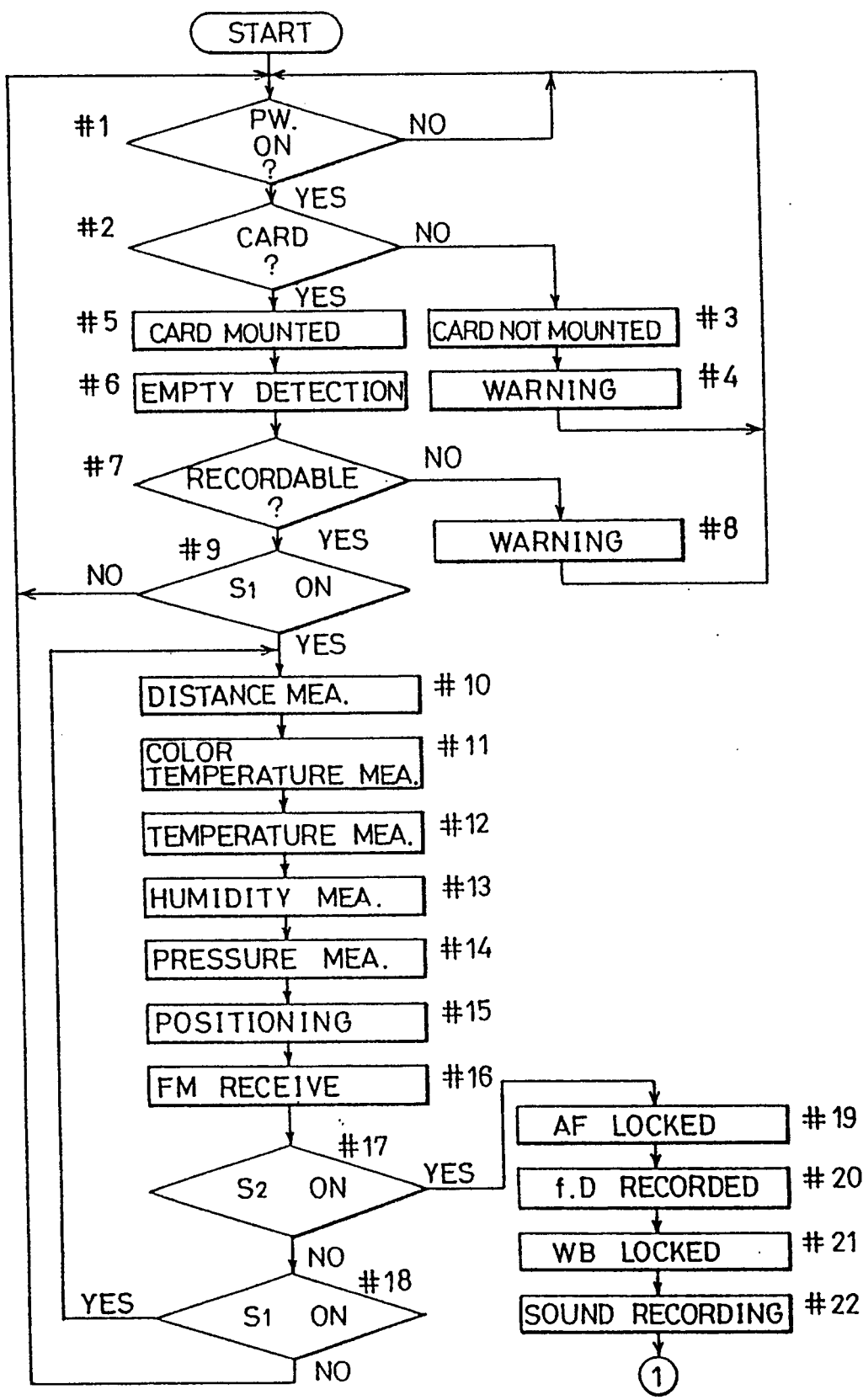
FIGS. 4A and 4B are flowcharts combinedly showing operations of the camera.
Figure 4B:
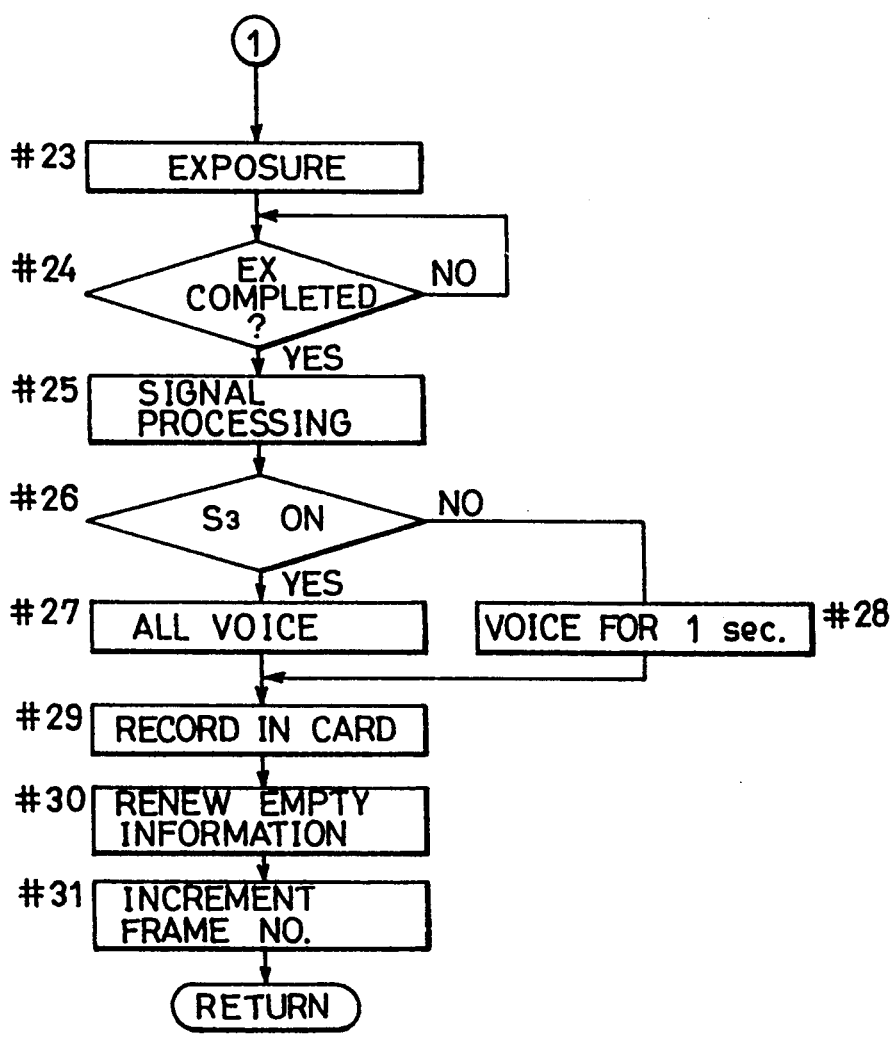

FIGS. 4A, 4B are flowcharts combinedly showing operations of the camera.

In Step #1, the photography routine waits until power supply (not shown) is turned on. When the power supply is turned on, the photography routine proceeds to Step #2 in which it is determined whether the memory card is mounted to the camera. If the memory card is not mounted to the camera, the photography routine proceeds to Step #3 in which an indication "Memory Card Not Mounted" is displayed, proceeds to Step #4 in which a warning is given to the photographer that photographing or recording cannot be performed and then returns to Step #1. In this case, a memory capable of recording a plurality of frames of images may be employed, independently of the memory card 26.

When the memory card 26 is mounted to the camera in Step #2, the photography routine proceeds to Step #5 in which an indication "Memory Card Mounted" is displayed. Subsequently the photography routine proceeds to Step #6 in which it is detected that the memory card 26 has emptied storage areas where new data is to be recorded therein. If the memory card 26 possesses no such emptied storage areas in Step #7, the photography routine proceeds to Step #8 in which a warning is given to the photographer that the memory card is unable to record any more data and then returns to Step #1. In the case the camera has a built-in memory capable of recording a plurality of frames of images as described above, it may be appropriate to further determine whether the built-in memory is capable of recording any more data.

On the other hand, if the memory card 26 is capable of recording new data, the photography routine proceeds to Step #9 in which it is discriminated whether the photography ready switch S1 is turned on. If the switch S1 is not turned on, it is determined that the camera is not ready for the photography yet and the photography routine returns to Step #1. If, instead, the switch S1 is turned on, the photography routine proceeds to Step #10 and subsequent Steps in which various operations and processings are performed for appropriate photography. In Step #10, the distance to the subject is measured by the AF sensor 15, and then the photography routine proceeds to Step #11 in which the color temperature is measured by the WB sensor 14. Subsequently, the photography routine proceeds to Steps 12, 13, and 14 in which the temperature is measured by the temperature sensor 17, the humidity is measured by the humidity sensor 18, and the atmospheric pressure is measured by the atmospheric pressure sensor 19 respectively. Then, the photography routine proceeds to Step #15 in which the positional information of the camera or the photographer is calculated with the use of the GPS signal receiving unit 23, and then proceeds to Step #16 in which the FM signals including the place code is received by the use of the FM signal receiving tuner unit 21 and FM signal demodulator unit 22. In the above Steps, all the image information obtained from the sensors and other units is sent to the CPU 20. However, it may be appropriate that a switch (not shown) is actuated so as to selectively send only desired image information to the CPU 20.

When the operation of sending all the necessary image information to the CPU 20 is completed, the photography routine proceeds to Step #17 in which it is discriminated whether the exposure start switch S2 is turned on. If the switch S2 is not turned on, the photography routine proceeds to Step #18 in which it is again discriminated whether the switch S1 is turned on. If the switch S1 is turned on, the photography routine returns to Step #10 in order to obtain the more accurate image information required prior to the photography. Thus, the sequence of Steps 10 to 16 is repeated. On the other hand, if the switch S1 is not turned on in Step #18, it is determined that photography is not required, then the photography routine returns to Step #1.

If the switch S2 is turned on in Step #17, the photography routine proceeds to Step #19 in which the autofocus lens 1 is locked at an infocus position. Subsequently, in Step #20, the focal length information f of the lens 1 and the subject distance information D from the AFCPU 16 are recorded. Then, the photography routine proceeds to Step #21 and then Step #22 in which the WB correction is locked, and the voice recording is started through the microphone 10. The photography routine proceeds to Step #23 in which the exposure operation is executed. Then, in Step #24 it is determined whether the exposure operation has been completed. If the exposure operation has been completed, specific signal processings for picking up the photographic image are started in Step #25.

Subsequently, in Step #26 it is discriminated whether the voice recording switch S3 is turned on. If the switch S3 is turned on, all the voices present are picked up in Step #27. On the contrary, if the switch S3 is not turned on, the photography routine proceeds to Step #28 in which the voice is picked up for one second for voice recognition.

Figure 27:
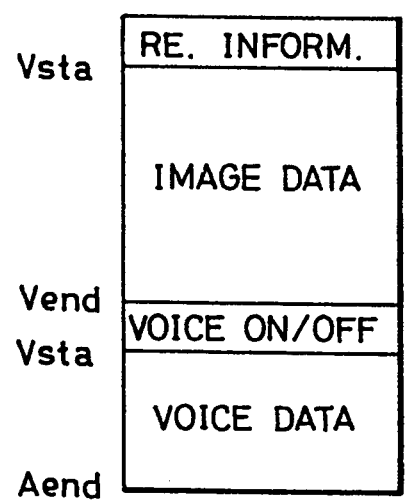
FIG. 27 is a diagram showing a memory map of a memory card mountable to the camera and the image editing/reproduction device.

After the above operations, the photography routine proceeds to Step #29 in which the image data, the voice data, and the photographic information obtained by the sensors and other units, are written in the memory card 26 with corresponding to one another (see FIG. 27.) The image information is to be used as retrieval information. Subsequently, in Step #30 the information regarding the emptied memory area in the memory card 26 is renewed and in Step #31 frame number is incremented by one. Then the photography routine returns to Step #1 to wait for the next photographing operation.

Figure 5A:
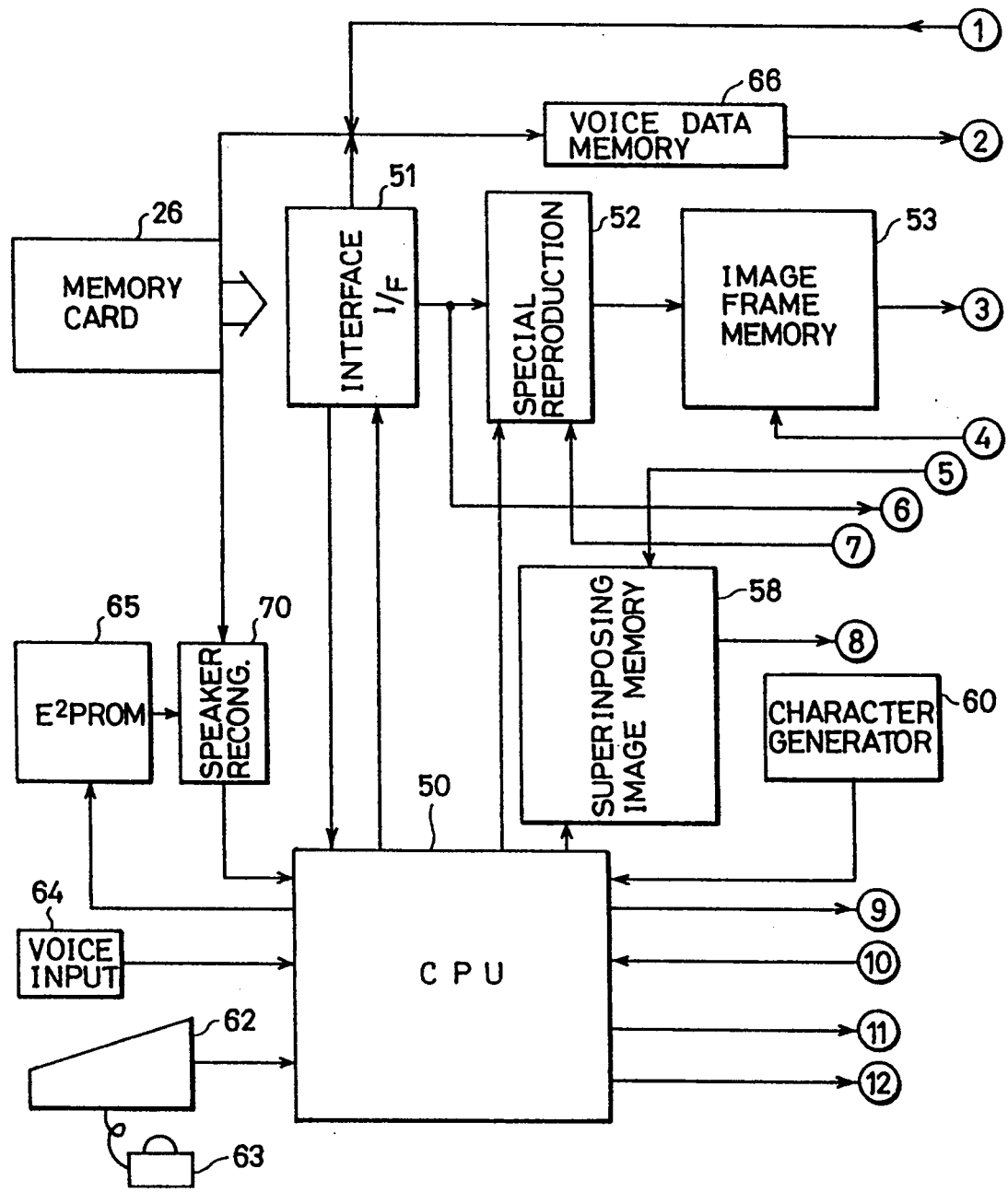
FIGS. 5A and 5B are block diagrams combinedly showing an overall construction of an image editing/reproduction device of the photographic system.
Figure 5B:
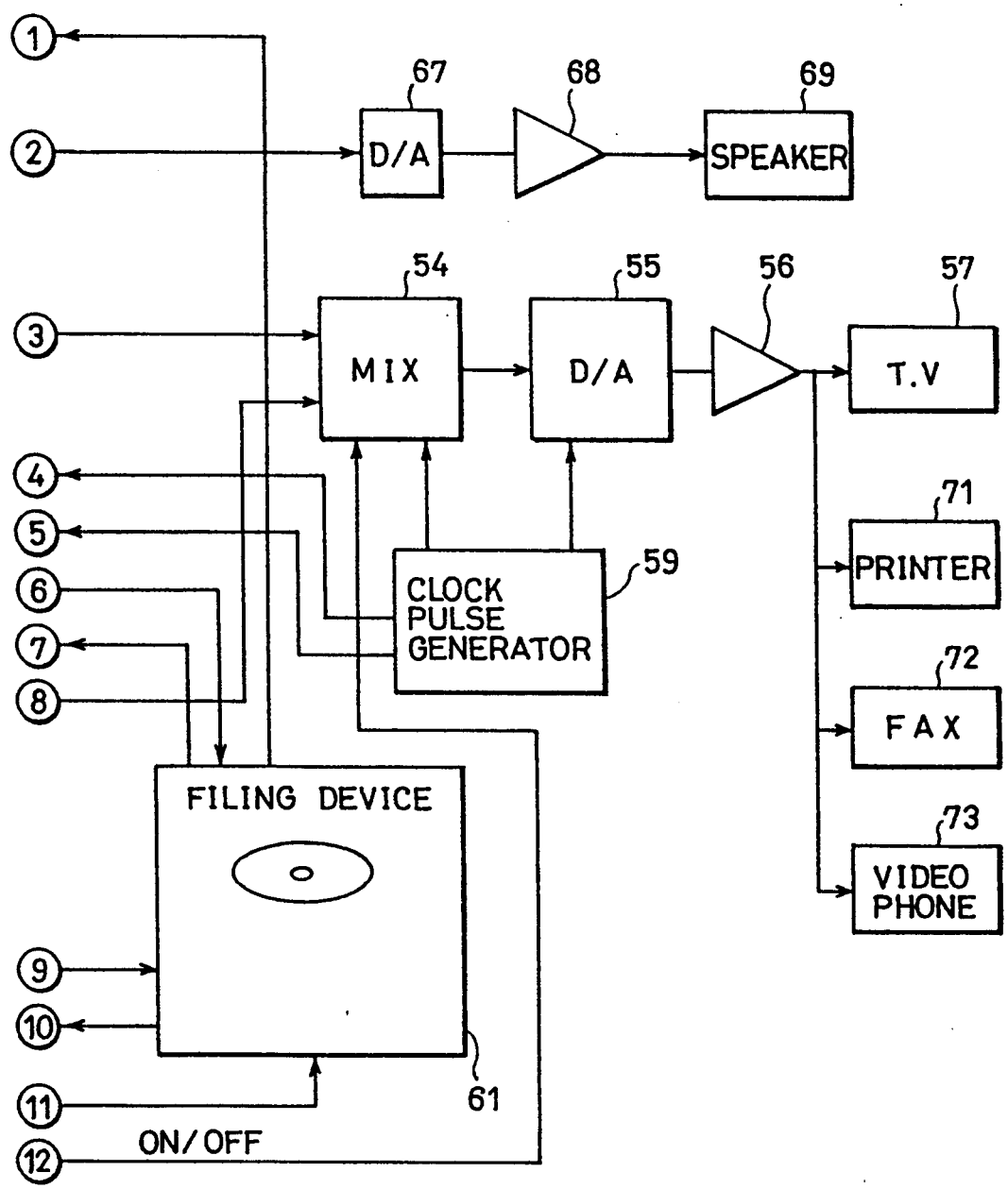

FIGS. 5A and 5B are block diagrams combinedly showing an image editing/reproduction device of the photographic system of the present invention having a function of retrieving the information.

The reproduction device is centrally controlled by a CPU 50 having a program prewritten therein so as to perform various reproducing, editing, and retrieving operations to be described hereinafter.

Indicated at 51 is an interface for sending the recorded image data, image information data, and data regarding storage area availability in the memory card from the memory card 26 to the reproduction device and sending command signals for reading out images from the reproduction device to the memory card 26. Indicated at 52 is a special reproduction processing unit for performing a special processing to the image read out of the memory card 26 in a manner hereinafter described. The image data processed in the special reproduction processing unit 52 is transferred to an image frame memory 53 where the image is temporarily stored. Indicated at 54 is a mixer for mixing the image data with a superimposing image data to be described below, which is turned on or off in accordance with a control signal from the CPU 50. The mixed image data is in the form of a digital signal and then sent to a digital to analog (hereinafter referred to as D/A) converter 55 wherein the image signal is converted into an analog signal. Subsequently, after being amplified by an amplifier 56, the analog signal is sent to a TV monitor 57 to be displayed thereon.

Indicated at 58 is a superimposing image memory for storing superimposed images such as various retrieval items, scale, which are displayed on screen. Indicated at 59 is a read out clock pulse generation circuit for generating and sending clock pulses to the image frame memory 53, the mixer 54, the D/A converter 55 and the superimposing image memory 58 so as to control their respective reading out timings.

Indicated at 60 is a character generator having a letter font memory and sends a letter code signal corresponding to the place code signal to the CPU 50. For example, in a case that place names are represented in Japanese, JIS letter font is stored in the letter font memory. Also, JIS character code is used for the place code. The relationship between the JIS letter font and the JIS character code are specified by Japanese Industrial Standards.

Indicated at 61 is a filing device comprising a recording medium, such as an optical disk, and a circuit for driving the recording medium. The filing device 61 is controlled by the CPU 50 so that desired image data stored in the memory card 26 is recorded on the recording medium. Also, the filing device is controlled by the CPU 50 so as to store retrieval information for image registration. Further, the filing device 61 sends the registered retrieval information and disk administrative information to the CPU 50.

Indicated at 62 is a keyboard for inputting image information and correcting the image information. The keyboard 62 is connected with designating member 63, such as a mouse, a trackball, and a tablet, for designating a particular place from a map or place names recorded in the filing device 61. Indicated at 64 is a voice input unit 64 for inputting the voice into CPU 50. Indicated at 65 is an EEPROM for storing encoded speaker's voice data. Indicated at 66 is a voice data memory for temporarily storing the voice inputted through the interface 51, the voice data having been previously recorded in the memory card 26. Subsequently, the voice data is transferred through a D/A converter 67 and an amplifier 68 to a speaker 69 where the voice is reproduced. Indicated at 70 is a speaker recognition unit for determining who the speaker is by collating the voice inputted through the interface 51 with the speaker's voice data registered in the EEPROM 65. The determination result is sent to the CPU 50 and used as an index in the time of information retrieval.

Indicated at 71, 72, and 73 are respectively a printer, a facsimile transmitter machine, and a video telephone.

With the above construction, there will be described operations in the reproduction device with reference to FIGS. 6 to 22 inclusive.

Figure 6:
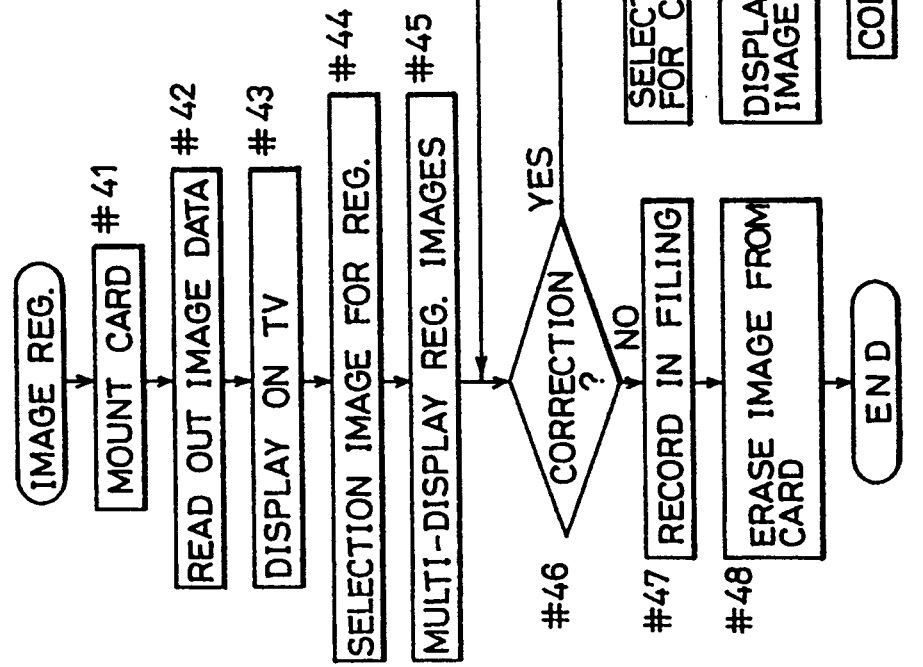
FIG. 6 is a flowchart showing an image registration routine.

Referring first to the FIG. 6, there will be described an image registration routine for registering the image data from the memory card 26 to the filing device 61.

After the memory card 26 is mounted to the reproduction device in Step #41, the image registration routine proceeds to Step #42 in which the recorded image data are sequentially read out. The read out image data are processed in the special reproduction processing unit 52, so that a plurality of images are displayed on TV monitor 57 (hereinafter referred to as multi-display) in Step #43. The multi-display is performed by allocating a predetermined number of images to one frame, or by allocating a set number of images to one frame. The set number is determined in accordance with the number of the images recorded in the memory card 26.

Subsequently, the image registration routine proceeds to Step #44 in which the CPU 50 enables the operator to select desired images to be registered in the filing device 61 out of all the images displayed on the monitor by the use of the keyboard 62. Then, the selected images are multi-displayed on the TV monitor 57 in Step #45 and the routine proceeds to Step #46 where the operator is inquired whether correction is to be made on an image information inputted when the photography is practiced, or whether any addition is to be made to the image information. In the above corrections and additions, for example, a speaker's name is corrected. When the speaker's name is seen to be wrong based on the speaker recognition, positional information and comments are corrected and added.

If no correction or addition of the image information is to be made in Step #46, the image registration routine proceeds to Step #47 in which the operator can perform registration operation by the use of keyboard 62 so as to record the image and the image information in the filing device 61. Consequently, the image data and image information recorded in the filing device 61 are erased from the memory card 26 in Step #48 and this routine ends. The above erasure operation creates a new emptied storage area in the memory card 26, consequently enabling the recordation of a new image.

On the other hand, if correction or addition of the image information is to be made in Step #46, the image registration routine proceeds to Step #49 in which the operator can select an image, which requires correction or addition of the image information thereof, by the use of the keyboard 62 and designating member 63, and in Step #50 the selected image and the image information are displayed on the TV monitor 57. Hence, the operator can make necessary correction or addition while viewing the ongoing operation of correction or addition of the image information. After the correction or addition for one image is completed, the routine returns to Step #46 in which the operator is inquired whether correction or addition is to be made on another image information. If there is any correction or addition to be made, the sequence of Steps #49 and 50 is repeated one image information after another until all the necessary corrections or additions are completed. Thereafter, the routine proceeds to Steps #47 and 48 where the above described operations are performed and ends the course thereof.

Figure 7:
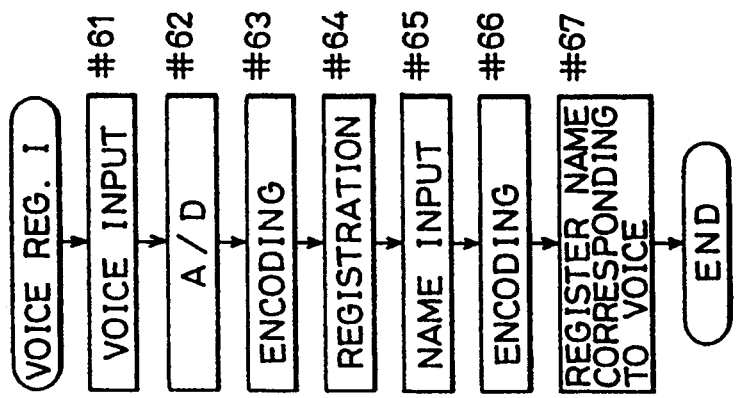
FIG. 7 is a flowchart showing a first voice registration routine.
Figure 8:
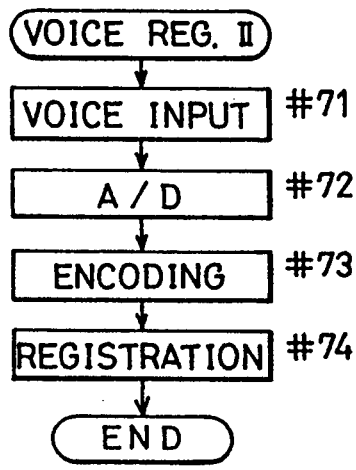
FIG. 8 is a flowchart showing a second voice registration routine.

Referring next to FIGS. 7 and 8, there will be described voice registration routines for registering a voice.

FIG. 7 shows a voice registration routine for registering the speaker's voice corresponding to the speaker's name. FIG. 8 shows another voice registration routine for registering only the speaker's voice. It may be appropriate that both voice registration routines be executed in Step #51 of the image registration routine It may also be appropriate to provide an independent mode for voice registration.

In thr voice registration routine of FIG. 7, after the CPU 50 first enables the voice input, the voice is inputted through a microphone of the voice input unit 64 in Step #61. Then, the inputed voice is A/D converted in Step #62 and encoded in Step #63. The encoded voice data is registered in the EEPROM 65 in Step #64. Subsequently, this voice registration routine proceeds to Step #65 in which the speaker's name is inputted by means of the keyboard 62. The inputted speaker's name is then encoded in Step #66. Consequently, the speaker's name is registered in the EEPROM 65 with being corresponded to the voice data of the speaker in Step #67.

Accordingly, in the time of retrieving an image based on the voice, as described below, the speaker's name is superimposed on the image displayed on the TV monitor 57.

In the voice registration routine of FIG. 8, after the CPU 50 first enables the voice input, the voice is inputted through the microphone of the voice input unit 64 in step 71. Then, the inputted voice is A/D converted in Step #72 and encoded in Step #73. Consequently, this voice registration routine proceeds to Step #74 in which the encoded voice data is registered in the EEPROM 65.

Accordingly, in the time of retrieving an image based on the voice, only the image is displayed on the TV monitor 57.

Referring next to FIG. 9 to 21, there will be described various retrieval routines.

Figure 9:
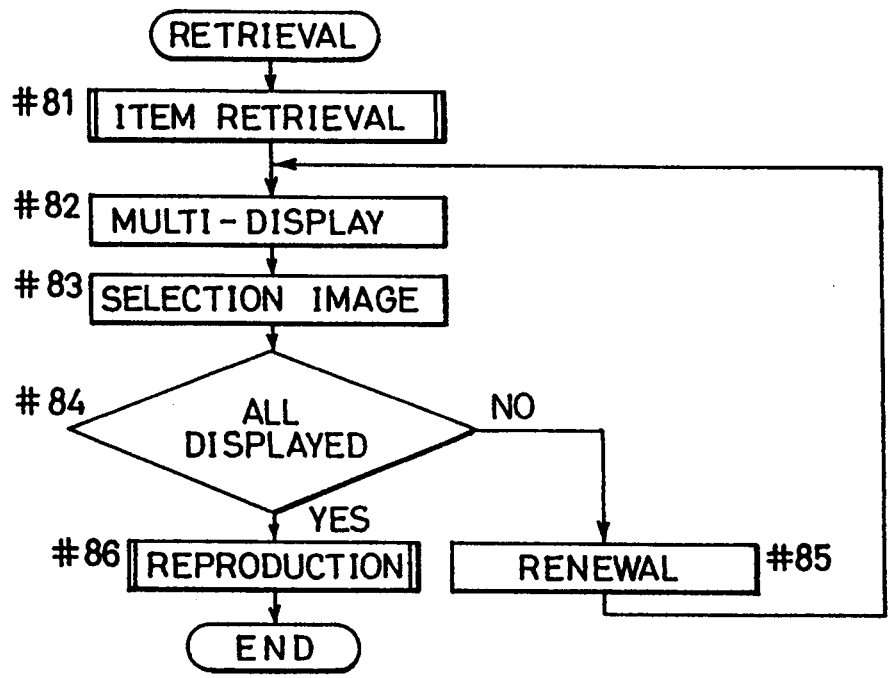
FIG. 9 is a flowchart showing a retrieval routine.

FIG. 9 is a flow chart showing a main retrieval routine showing information retrieval processings.

First, the operator inputs a desired retrieval item with the use of the keyboard 62 or the like. Then, the CPU 50 collates the inputted retrieval item with image information for each image in Step #81. Images belonging to the retrieval item are sequentially read out of the memory card 26 and multi-displayed on the TV monitor 57 in Step #82. Then, the operator selects one or more desired images out of all the images multi-displayed in Step #83. Subsequently, the main retrieval routine proceeds to Step #84 in which upon completion of selection of images from the currently multi-displayed images, it is determined whether all the images belonging to the retrieval item have already been multi-displayed. If there still remains more images belonging to the retrieval item, the TV monitor screen is renewed with the succeeding multi-display including the remaining images in Step #85. When all the images belonging to retrieval item pass through the selection process, the selected images are reproduced consequently in a desired reproduction format to be described below in Step #86.

Figure 10:
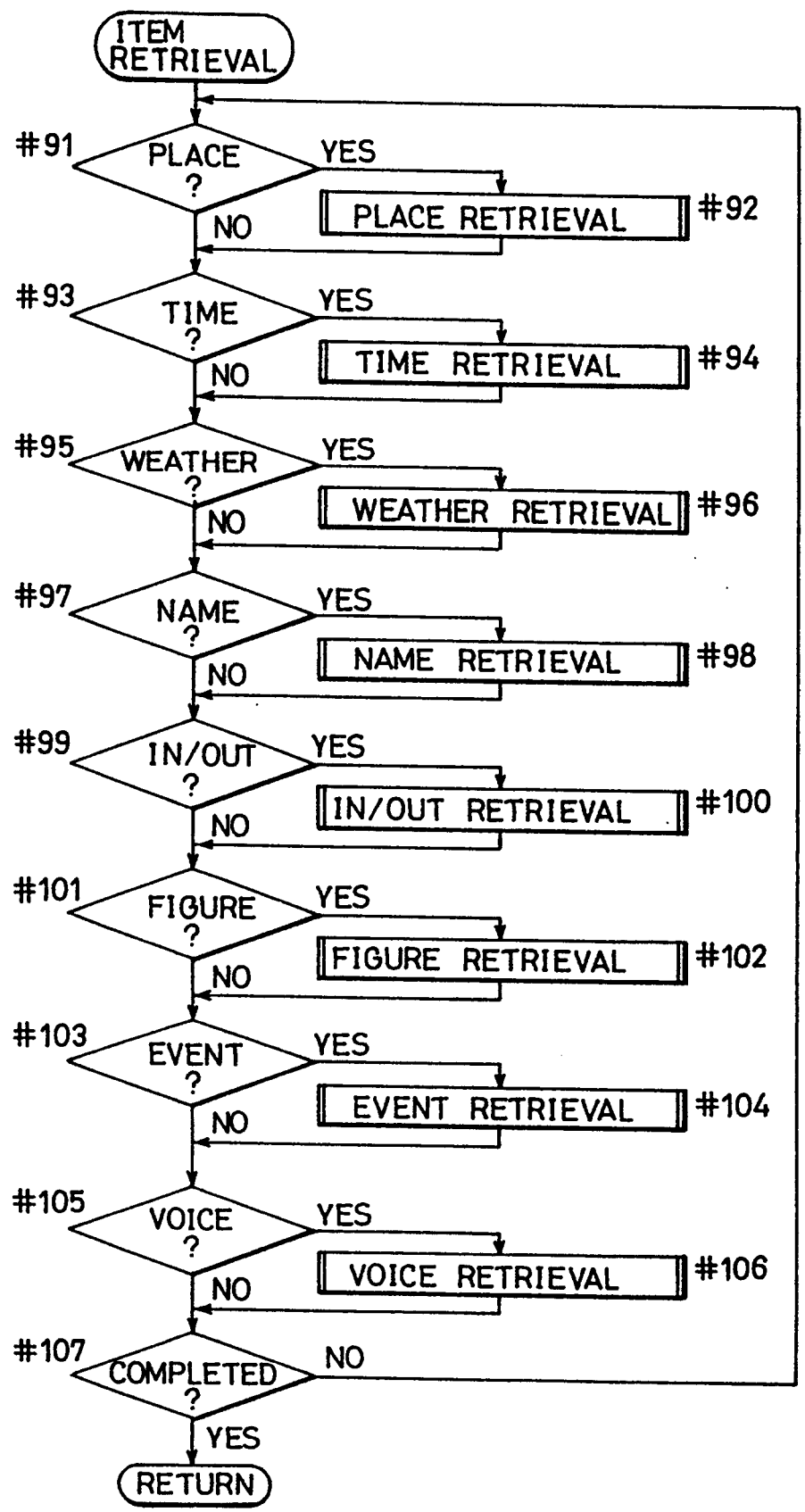
FIG. 10 is a flowchart showing an item retrieval routine.

FIG. 10 is a flowchart showing an item retrieval routine executed in Step #81 of the main retrieval routine.

Retrieval items in this embodiment are "place," "time," "weather," "person's name," "indoor/outdoor," "human figure (portrait)/landscape," "event," and "voice."

Figure 12:
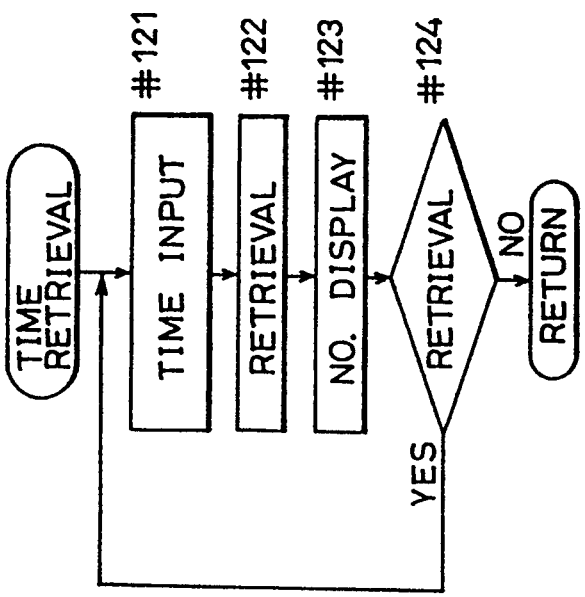
FIG. 12 is a flowchart showing a time retrieval routine.
Figure 11:
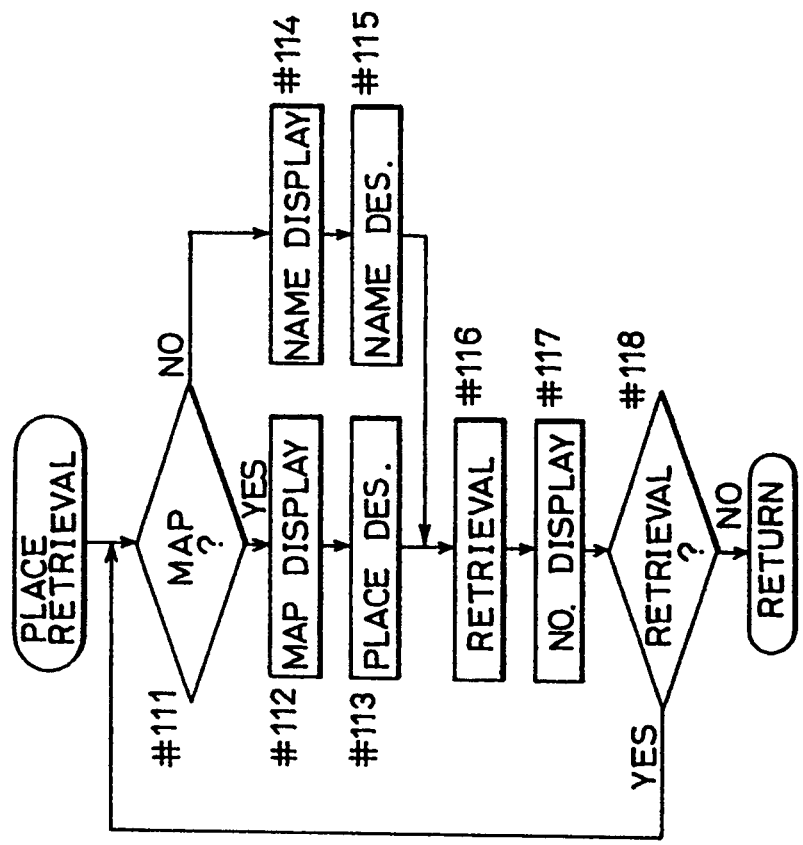
FIG. 11 is a flowchart showing a place retrieval routine.
Figure 14:
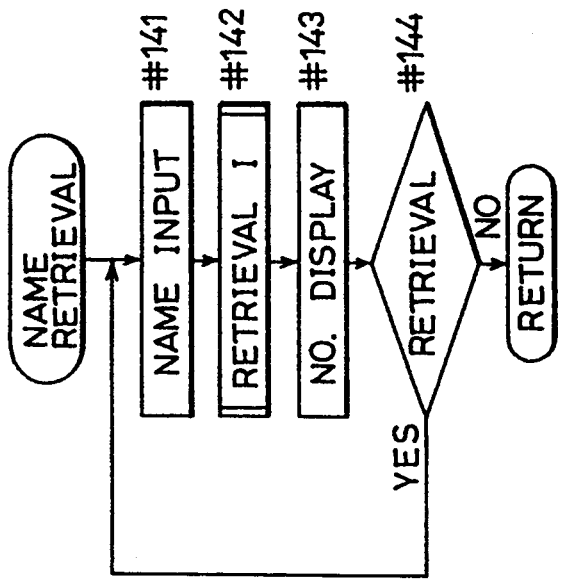
FIG. 14 is a flowchart showing a person's name retrieval routine.
Figure 13:
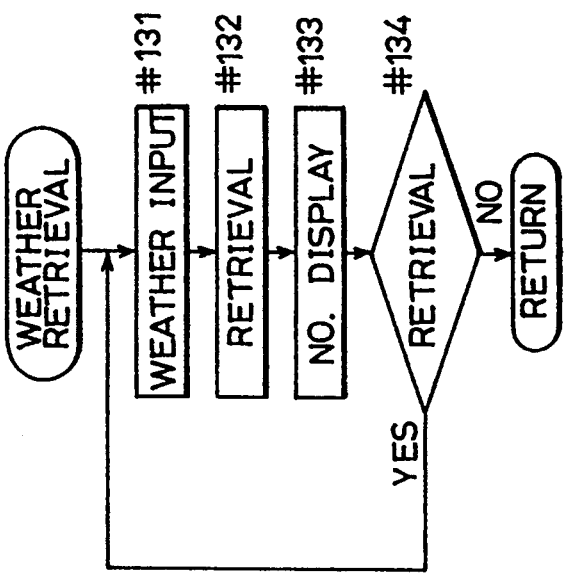
FIG. 13 is a flowchart showing a weather retrieval routine.
Figure 16:
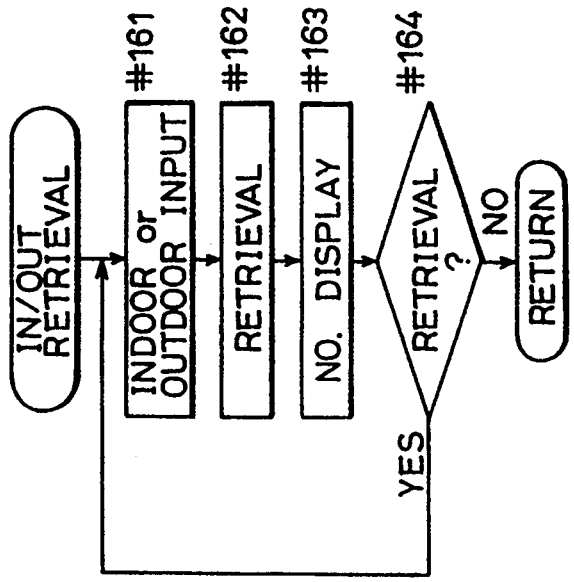
FIG. 16 is a flowchart showing an indoor/outdoor retrieval routine.
Figure 15:
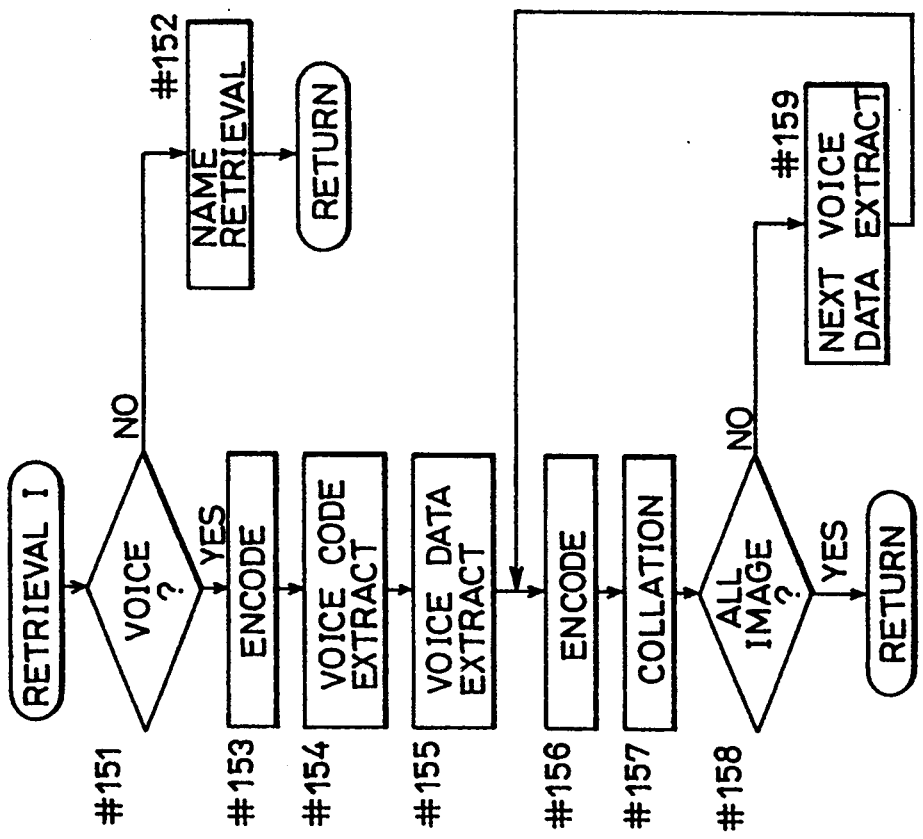
FIG. 15 is a flowchart showing a retrieval process routine executed in the place retrieval routine.
Figure 18:
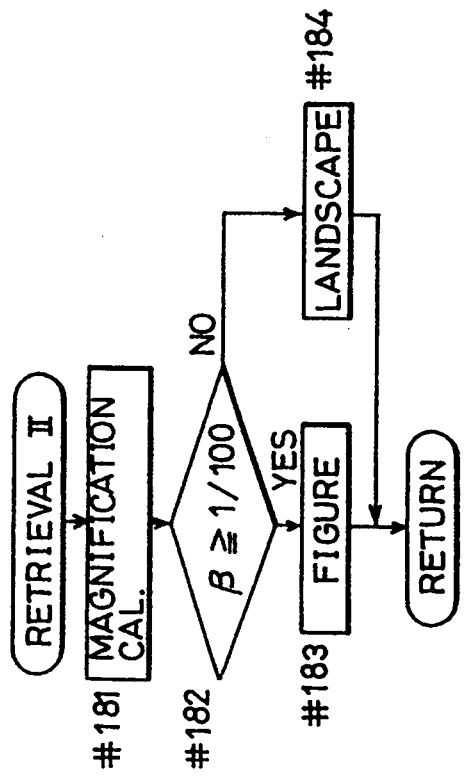
FIG. 18 is a flowchart showing a retrieval process routine executed in the human figure/landscape retrieval routine.
Figure 17:
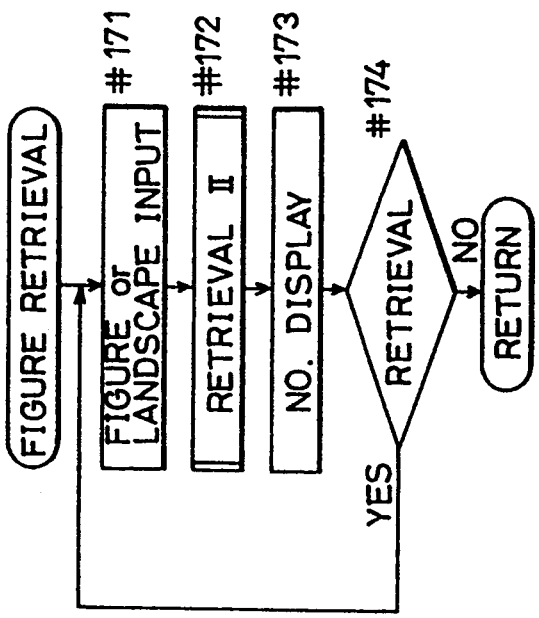
FIG. 17 is a flowchart showing a human figure/landscape retrieval routine.
Figure 19:
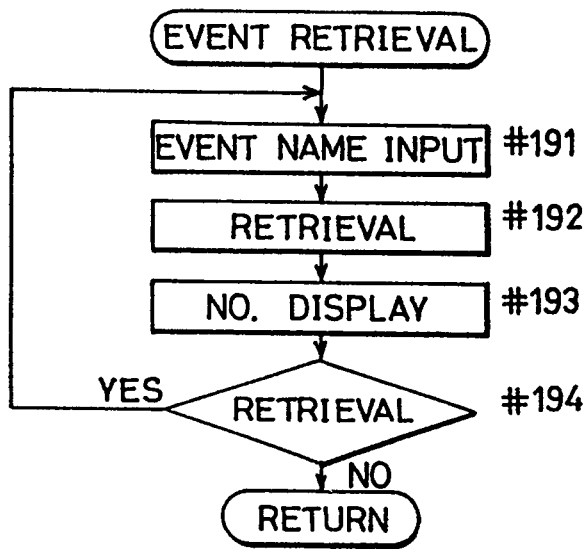
FIG. 19 is a flowchart showing an event retrieval routine.
Figure 20:
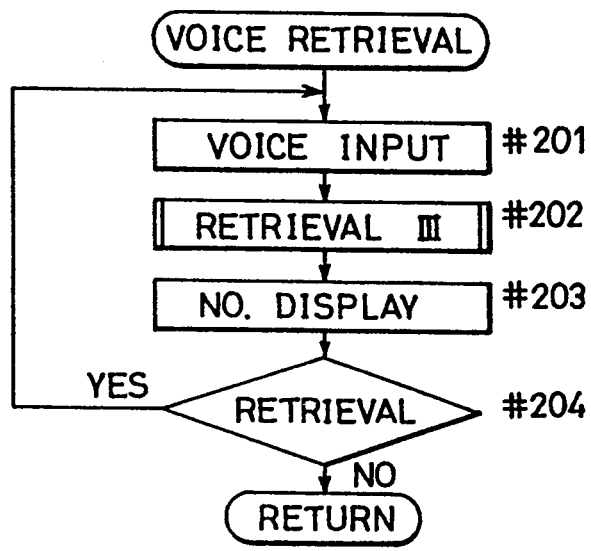
FIG. 20 is a flowchart showing a voice retrieval routine.
Figure 21:
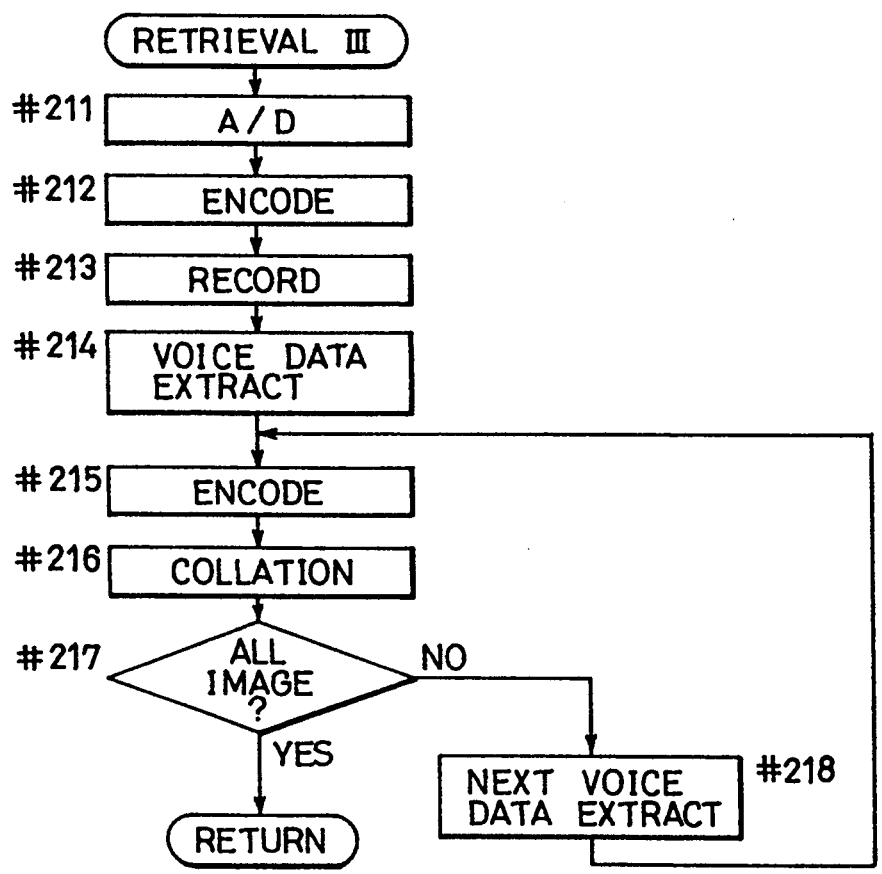
FIG. 21 is a flowchart showing a retrieval process routine executed in the voice retrieval routine.

When the item retrieval is started, the item retrieval routine first proceeds to Step #91 in which the operator is inquired whether he/she selects "place" as a retrieval item. If the operator selects the "place" item, a "place" item retrieval routine shown in FIG. 11 is executed in Step #92. If the operator does not select the "place" item, the item retrieval routine proceeds to Step #93 in which the operator is inquired whether he/she selects "time" as a retrieval item. If the operator selects the "time" item, a "time" item retrieval routine shown in FIG. 12 is executed in Step #94. If the operator does not select the "time" item, the item retrieval routine proceeds to Step #95 in which the operator is inquired whether he/she selects "weather" as a retrieval item. If the operator selects the "weather" item, a "weather" item retrieval routine shown in FIG. 13 is executed in Step #96. If the operator does not select the "weather" item, the item retrieval routine proceeds to Step #97 in which the operator is inquired whether he/she selects "person's name" as a retrieval item. If the operator selects the "person's name" item, a "person's name" item retrieval routine shown in FIG. 14 is executed in Step #98. If the operator does not select the "person's name" item the item retrieval routine proceeds to Step #99 in which the operator is inquired whether he/she selects "indoor/outdoor" as a retrieval item. If the operator selects the "indoor/outdoor" item, a "indoor/outdoor" item retrieval routine shown in FIG. 16 is executed in Step #100. If the operator does not select the "indoor/outdoor" item, the item retrieval routine proceeds to Step #101 in which the operator is inquired whether he/she selects "human figure/landscape" as a retrieval item. If the operator selects the "human figure/landscape" item, a "human figure/landscape" item retrieval routine shown in FIG. 17 is executed in Step #102. If the operator does not select the "human figure/landscape" item, the item retrieval routine proceeds to Step #103 in which the operator is inquired whether he/she selects "event" as a retrieval item. If the operator selects the "event" item, an "event" item retrieval routine shown in FIG. 19 is executed in Step #104. If the operator does not select the "event" item, the item retrieval routine proceeds to Step #105 in which the operator is inquired whether he/she selects "voice" as an retrieval item. If the operator selects the "voice" item, a "voice" item retrieval routine shown in FIG. 20 is executed in Step #106. Consequently, the item retrieval routine proceeds to Step #107 in which the operator is inquired whether he/she needs to change to or add another retrieval item. If the operator needs to change to or add another retrieval items, the item retrieval routine returns to Step #91 to repeat the sequence of Step #91 to 106. When all the necessary item retrievals are completed, the item retrieval routine returns to Step #82 of the main retrieval routine.

It should be noted that different retrieval items may be combined to function as one retrieval item. In other words, the retrieval may possibly be executed under a plurality of items.

Hereinafter, there will be described the above-mentioned item retrieval routines in detail with reference to FIGS. 11 to 21 respectively.

FIG. 11 shows the "place" item retrieval routine, wherein the place code and/or the positional data from GPS serve as place information.

First, in Step #111, the operator is inquired whether he/she requires a map representation on the TV monitor 57. If the operator require the map representation, that is, in the case that the operator designates the photographing site on a map, the map data is sent to the TV monitor 57 and displayed thereon in Step #112. The map data is recorded in the filing device 61, a memory (not shown) carried by the CPU 50, or a detachably mountable memory exclusively for maps. Subsequently, the operator designates the photographing site on the displayed map through the use of the designating member 63, such as a mouse in Step #113. In other words a particular retrieval condition is designated. The designated place having particular latitude and longitude is calculated based on the displayed map and a position signal sent from the designating member 63. Alternatively, a particular place may be detected by means of a tablet or the like.

On the other hand, if the operator does not require the map representation on the TV monitor 57, the "place" item retrieval routine proceeds to Step #114 in which all the place names recorded in connection with the recorded images are read out and displayed on the TV monitor 57. The operator designates a desired place name through the use of the keyboard 62 in Step #115. Subsequently, in Step #116, the CPU 50 executes the process for retrieving the images belonging to the designated place or the designated place name. The retrieval is executed by scanning the place information. Upon completion of the retrieval process, the number of the images belonging to the designated place or place name is displayed on the TV monitor 57. At this stage, it may be appropriate to display frame numbers of the images. Consequently, the operator is inquired whether the retrieval process should be re-executed in Step #118. For example, the retrieval process is re-executed when there are too many images belonging to the designated place or place name or there are retrieved no such images. The CPU 50 re-executes the retrieval process with another retrieval condition repeating the sequence of Steps #111 to 117. When all the necessary retrieval is completed in Step #118, the "place" item retrieval routine returns to Step #93.

FIG. 12 shows the "time" item retrieval routine, wherein the time data from the clock 24 serves as time information.

When a particular time is designated through the use of keyboard 62 in Step #121, i.e., a particular retrieval condition is designated, the CPU 50 executes the process for retrieving the images belonging to the retrieval condition in Step #122. The retrieval process is executed by scanning all the time information recorded in connection with the recorded images. It should be noted that the CPU 50 is provided with a memory in which date and season data are recorded in connection with each other. Accordingly, when a particular season is designated as a retrieval condition, the designated season data is converted to the date data corresponding thereto in the memory, and then the retrieval process is executed in accordance with the converted date data.

Upon completion of the above retrieval process, the number of the images belonging to the designated retrieval condition is displayed on the TV monitor 57 in Step #123. It may be appropriate to display frame numbers of the images as described above. Subsequently, the operator is inquired whether the retrieval process should be re-executed in Step #124. The CPU 50 re-executes the retrieval process with another retrieval condition by repeating the sequence of Steps #121 to 123. Upon completion of the above retrieval process, the "time" item retrieval routine returns to Step #95.

FIG. 13 shows the "weather" item retrieval routine, wherein the temperature and humidity data from the temperature sensor 17 and the humidity sensor 18 serves as weather information.

When a particular weather, such as "fine," "rain," "hot," and "cold," is designated by the operator through the use of keyboard 62 in Step #131 as a retrieval condition, the CPU 50 executes the process for retrieving the images belonging to the retrieval condition by scanning the weather information in Step #132. The CPU 50 is provided with a memory in which a relationship between the weather information and the temperature and humidity information is recorded. If "hot" is specified as a retrieval condition, for example, images are retrieved which are photographed under a reference temperature of not lower than 30° C. and a reference humidity of not less than 80%. Further it may be appropriate that the reference temperature and humidity are changed according to where and when the images are photographed. For example, into weather information "summer+hot," are sorted images photographed in July, August, or September under a temperature of not lower than 30° C. On the other hand, into weather information "winter+hot" are sorted images photographed in December, January or February under a temperature of not lower than 25° C. The designated weather information, such as "summer+hot" and "winter+hot" in the above examples, is converted to the temperature and humidity information corresponding thereto, and then the retrieval process is executed in accordance with the converted temperature and humidity information. If the atmospheric pressure data serves as weather information in this routine together with the temperature and humidity data, a further accurate retrieval can be effected.

Upon completion of the above retrieval process, the number of the images belonging to the designated retrieval condition is displayed on the TV monitor 57 in Step #133. Subsequently, the operator is inquired whether the retrieval process should be re-executed in Step #134. When another retrieval condition other than the time data is designated, the CPU 50 re-executes the retrieval process with another retrieval condition by repeating the sequence of Step #131 to 133. Upon completion of the retrieval process, the "weather" item retrieval routine returns to Step #97.

FIG. 14 shows the "person's name" item retrieval routine wherein the voice and the person's name serve as personal information.

When a person's name is designated through the use of keyboard 62 in Step #141, the CPU 50 executes the process for retrieving the images belonging to the retrieval condition in Step #142. The above retrieval process is executed in accordance with an retrieval process I routine shown in FIG. 15. In the retrieval process I routine, it is first discriminated whether the retrieval process is executed under the person's name or the voice thereof in Step #151. If the retrieval process is executed under the voice, the designated person's name is encoded and converted into a person's name code in Step #153. Then, the voice code corresponding to the person's name code is read out of the EEPROM 65 in Step #154. Subsequently, all the voice information corresponding to the registered image data is read out of the filing device 61 in Step #155 and then encoded in Step #156. In Step #157, the voice code from the EEPROM 65 and the voice information codes from the filing device 61 are collated with each other by sequentially scanning all the voice information codes. Then, it is determined whether all the voice information codes are collated with the voice code from the EEPROM 65 in Step #158. If there still remains the voice information codes to be collated with, the sequence of Step #156 to 157 is repeated untill there is no such voice information code. When the collation process is completed, the retrieval process I routine proceeds to Step #143.

On the other hand, in the case of the retrieval process under the person's name, the images belonging to the designated person's name are retrieved by scanning all the person's name information corresponding to the image data registered in the filing device 61 in Step #152, and the retrieval process I routine returns to Step #143 upon completion of the retrieval process.

Referring back to FIG. 14, the number of the images retrieved in the retrieval process I routine is displayed on the TV monitor 57 in Step #143. Thereafter, the operator is inquired whether the above retrieval process should be re-executed in Step #144. If another person's name is designated, the CPU 50 re-executes the retrieval by repeating the sequence of Steps #141 to 143. Upon completion of the above retrieval, the "person's name" item retrieval routine returns to Step #99.

FIG. 16 shows the "indoor/outdoor" item retrieval routine, wherein the color temperature data from the WB sensor 14 serves as indoor/outdoor information.

When either "indoor" or "outdoor" is selectively designated through the use of the keyboard 62 in Step #161 as a retrieval condition, the CPU 50 executes the process for retrieving the images belonging to the retrieval condition by scanning all the indoor/outdoor information in Step #162. The CPU 50 is provided with a memory in which a relationship between the indoor/outdoor information and the color temperature data for the WB sinsor 14. For example, color temperature data corresponding to that of the fluorescent light is sorted into the "indoor" retrieval information. On the other hand, color temperature data corresponding to that of the sun light is sorted into the "outdoor" retrieval information. In the time of the retrieval process, the designated retrieval condition, either one of "indoor" or "outdoor," is converted into the color temperature data corresponding thereto and the retrieval process is executed in accordance with the converted color temperature data, Upon completion of the above retrieval process, the number of the images belonging to the designated retrieval condition is displayed on the TV monitor 57 in Step #163. Subsequently, the operator is inquired whether the retrieval process should be re-executed in Step #164. If another retrieval condition is designated, the CPU 50 re-executes the retrieval process with another retrieval condition by repeating the aforementioned sequence of Steps #161 to 163. Upon completion of the retrieval process, the "indoor/outdoor" item retrieval routine returns to Step #101.

FIG. 17 shows the "human figure/landscape" item retrieval routine, wherein the image magnification $\beta$ calculated from the focal length f and the subject distance D serves as human figure/landscape information.

First, when either one of "human figure" or "landscape" is designated by means of the keyboard 62 in Step #171, the CPU 50 executes the process for retrieving the image belonging to the designated retrieval condition in Step #172. The above retrieval process II is executed in accordance with an retrieval process routine II shown in FIG. 18. In the retrieval process routine, all the focal length information f and the subject distance information D corresponding to the registered image data are read out from the filing device 61, and then the respective image magnifications $\beta = f \times D$, for all the registered images are calculated in Step #181. Subsequently, it is determined whether the calculated image magnification $\beta$ is not smaller than 1/100 in Step 182. If the image magnification $\beta$ is not smaller than 1/100, the image data corresponding thereto is judged to be a "human figure" image, and this routine proceeds to Step #183 in which the image data is stored. On the contrary, if the image magnification $\beta$ is smaller than 1/100, the image corresponding thereto is judged to be a "landscape" image, and this routine proceeds to Step #184 in which the image data is stored. Then, the CPU 50 extract the image data stored in Step #183 when "human figure" is selected as a retrieval condition while extracting the image data stored in Step #184 when "landscape" is selected as a retrieval condition.

Also, it may be appropriate to discriminate each image data into "human figure" or "landscape" depending on the image magnification thereof in a similar manner as described above. When all the image data are checked, the retrieval processing II returns to Step #173.

Referring back to FIG. 17, the number of the images retrieved in the retrieval process II routine is displayed on the TV monitor 57 in Step #173. Thereafter, the operator is inquired whether the above retrieval process should be re-executed in Step #174. If another retrieval condition is selected, the CPU 50 re-executes the retrieval process with this retrieval condition by repeating the sequence of Steps #171 to 173 once again Upon completion of the above retrieval process, the "human figure/landscape" item retrieval routine returns to Step #103.

Although the relationship between the image magnification $\beta$ and the retrieval item, "human figure" and "landscape," is recorded as a program in the above embodiment, it may also be suitable that the CPU 50 is provided with a memory in which the image magnification $\beta$ are recorded with corresponding to the retrieval items, "human figure" and "landscape." Further, as an alternative retrieval method, the following method may be used. The image magnification $\beta$ is calculated in accordance with the recorded focal length information f and subject distance information D. Image magnification ranges are preset which correspond to the "human figure" and "landscape" retrieval items respectively. The retrieval process is executed by discriminating whether the image magnification $\beta$ for each image data lies within either of the above two image magnification ranges.

FIG. 19 shows the "event" item retrieval routine, wherein the place code (event code) serves as event information.

First, when a particular event name is designated by means of the keyboard 62 in Step #191, the CPU 50 executes the process for retrieving the images belonging to the designated retrieval condition by scanning all the event information corresponding to the image data registered in the filing device 61 in advance in Step #192. Upon completion of the above retrieval process, the number of the image data belonging to the designated retrieval condition is displayed on the TV monitor 57 in Step #193. Thereafter, the operator is inquired whether the retrieval process should be re-executed in Step #194. If another retrieval condition is designated, the CPU 50 re-executes the retrieval process with another retrieval condition by repeating the aforementioned sequence of Steps #191 to 193. Upon completion of the retrieval process, the "event" item retrieval routine returns to Step #105.

If a publicly determined place identification code or letter code adapted for representing event sites is used as the place code, direct retrieval by the above code is made possible. Accordingly, the photographed images can be directly recorded without discriminating the content of the place code thereof. Also, special discrimination means for discriminating the content of the place code is not required, which consequently enables the editing/reproduction device to have a simpler construction.

FIG. 20 shows the "voice" item retrieval routine, wherein the voice data corresponding to the registered image data serves as voice information.

When a voice is designated through the microphone of the voice input unit 64 in Step #201 as a retrieval condition, the CPU 50 executes the process for retrieving the images belonging to the designated retrieval condition in Step #192. The above retrieval process is executed in accordance with an retrieval process III routine shown in FIG. 21. In the retrieval process III routine, the designated voice is first A/D converted and encoded in Steps #211 and #212 respectively. Then, the encoded voice data is recorded in an unillustrated reference unit in Step #214. Subsequently, all the voice data corresponding to the image data registered in advance in the filing device 61 are read out in Step #214 and encoded in Step #215. Thereafter, the encoded voice data from the above reference unit is collated with all the voice data from the filing device 61 by sequentially scanning all the voice data in Steps #217 and #218. Upon completion of the above retrieval process, the retrieval process III returns to Step #203.

Referring back to FIG. 20, the number of the images retrieved in the retrieval process III routine is displayed on the TV monitor 57 in Step #203. Thereafter, the operator is inquired whether the above retrieval process should be re-executed in Step #204. If another retrieval condition is designated, the CPU 50 re-executes the retrieval process with another retrieval condition by repeating the sequence of Steps #201 to 203 once again. Upon completion of the above retrieval process, the "voice" item retrieval routine returns to Step #107.

Figure 22A:
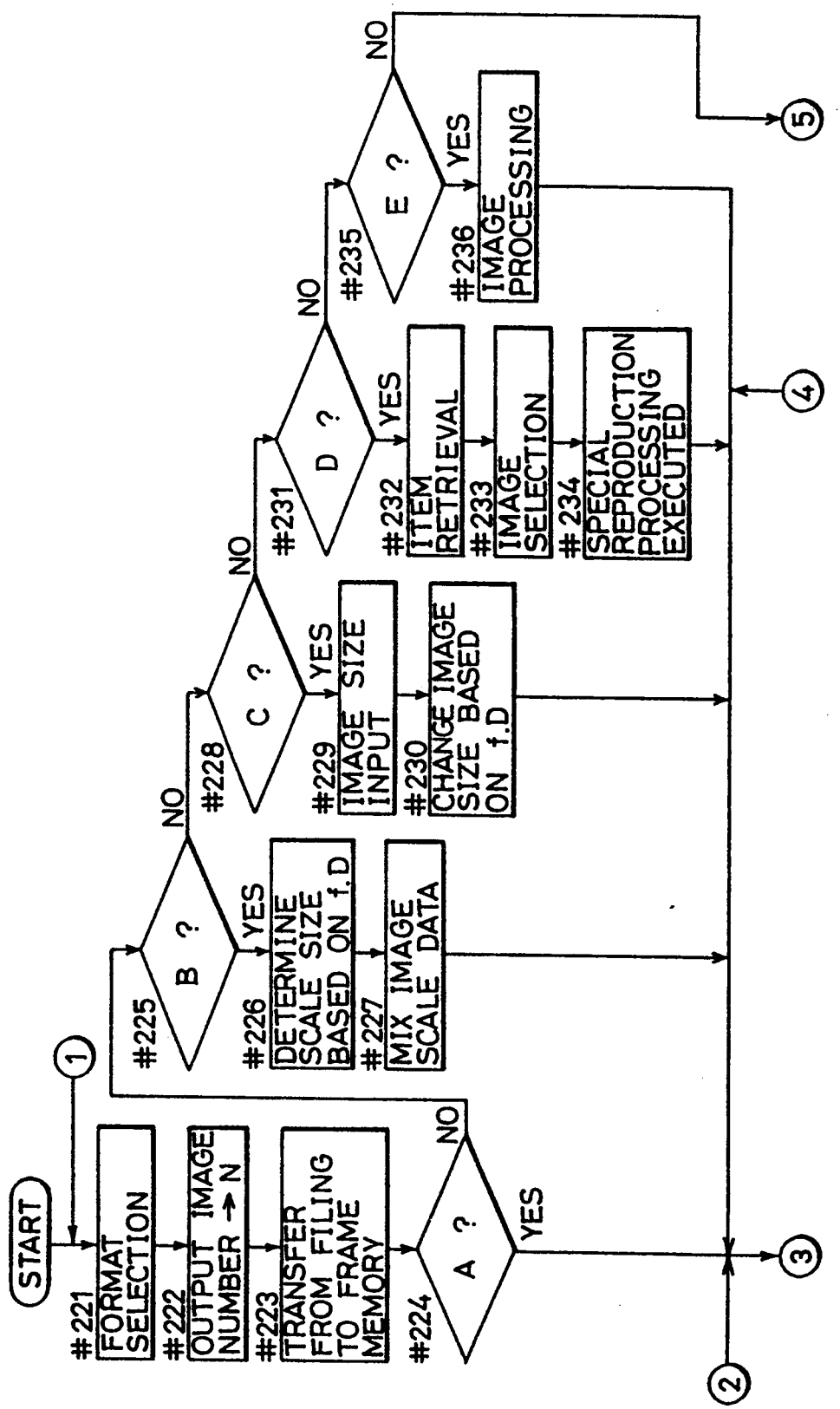
FIGS. 22A and 22B are flowcharts combinedly showing a reproduction routine.
Figure 22B:
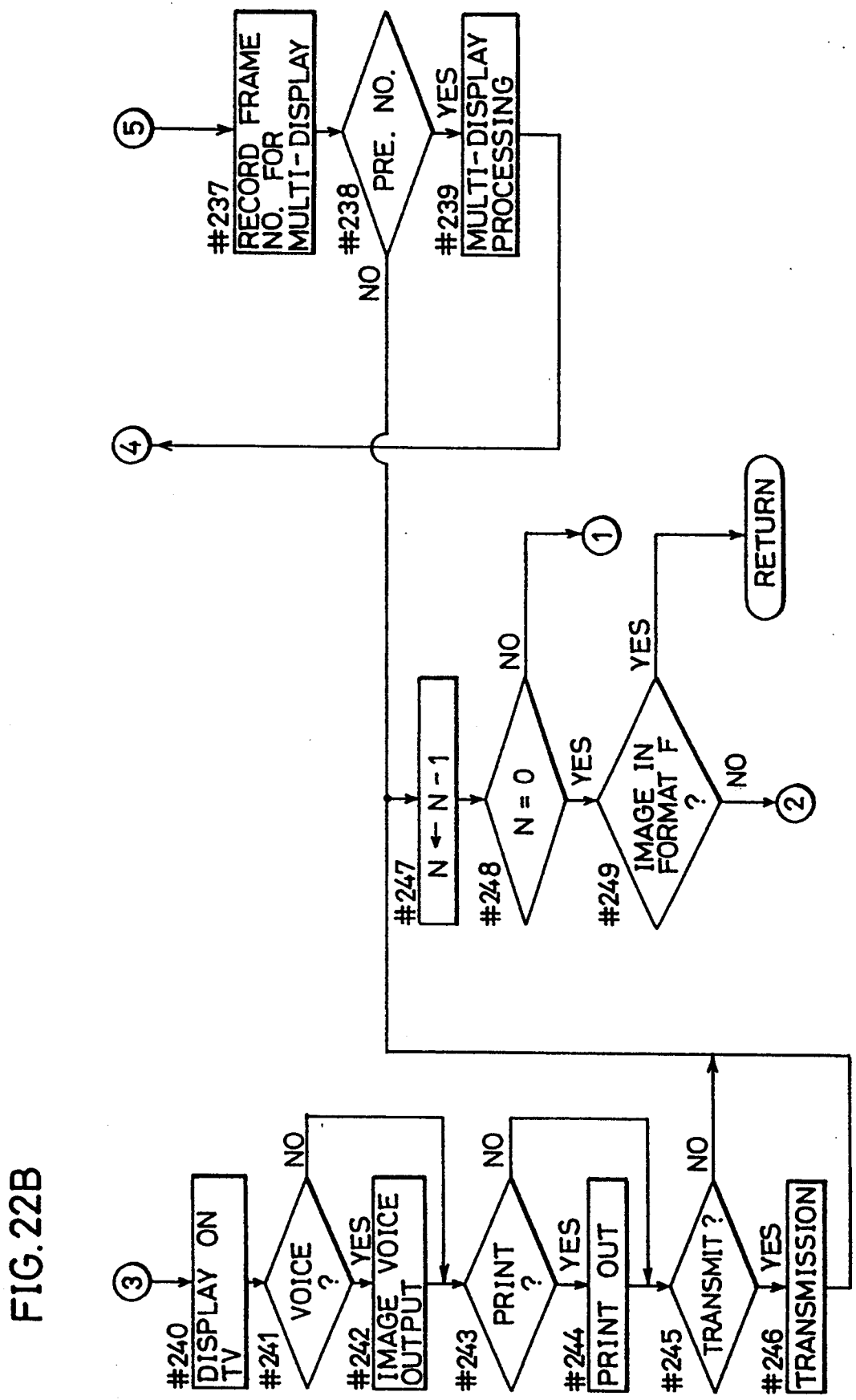

Next, the reproduction routine in Step #86 of FIG. 9 will be described with reference to FIGS. 22A and 22B.

In this routine, a reproduction format is first selected in Step #221. There are following six reproduction formats.

A . . . normal reproduction format
B . . . scale written reproduction format
C . . . size designated reproduction format
D . . . combinatory reproduction format E ... special reproduction format
F ... multiple image reproduction format Upon comletion of all the necessary information retrieval, a desired reproduction format is selected out of the above six reproduction formats. After, for example, the code corresponding to the selected reproduction format is inputted by means of the keyboard 62 in Step #221, the number N of the retrieved images is set in Step #222. Subsequently, the retrieved image data are read out of the filing device 61 in the increasing order of frame numbers and then sequentially transferred to the image frame memory 53 in Step #223. In subsequent steps, the reproduction of image is executed in a selected format. If the reproduction format A is selected, the image is directly displayed on the TV monitor 57. If the reproduction format B is selected, information regarding the size of the image on the image forming plane, that is, the scale of the image is determined based on the focal length information f and the subject distance information D in Step #226, and then the scale is superimposed with the image in Step #227. In other words, the scale data is superimposed with the image data in the mixer 54 and sent to the TV monitor 57.

Figure 23:
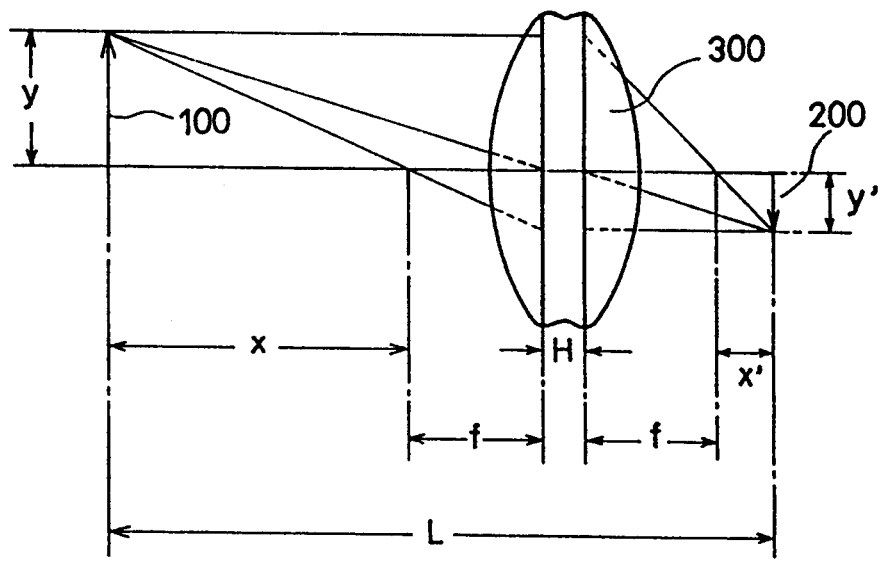
FIG. 23 is a diagram showing a principle of an image formation.
Figure 24A:
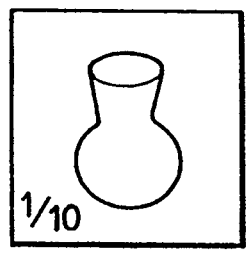
FIGS. 24A and 24B are diagrams respectively showing examples of displaying a scale on a display screen.
Figure 24B:
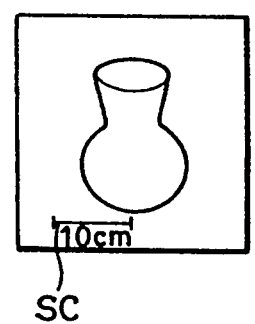

For example, in the case that a unit scale SC is displayed on the TV monitor 57 as shown in FIG. 24B, the relative length of the unit scale SC is calculated based on the image magnification $\beta$ calculated from the focal length information f and the subject distance information D. Here, there will be specifically described the calculation of the relative length of the unit scale SC with reference to FIG. 23, which is a diagram showing a principle of how an image is formed. In FIG. 23, indicated at L is a subject distance, which is a distance between a subject 100 and an image forming plane 200. Indicated at f is a focal length of a taking lens 300, at H a distance between the two principal points of the taking lens 300, at x a distance between the subject 100 and the front focal point of the taking lens 300, at x' a distance between the image forming plane and the rearward focal point of the taking lens 300, at y a length of the subject 100 and at y' a length of the image of the subject 100 on the image forming plane 200. The relationship of the above variables L, f, H, x, x', y, y' can be expressed in the following two equations (1) and (2).

$$y \cdot y' = x \cdot f = f \cdot x' \tag{1}$$

$$x' = L - 2f - H - x \tag{2}$$

From the above two equations is obtained the following quadratic equation (3) with respect to x.

$$x^2 - (L - 2f - H)x + f^2 = 0 \tag{3}$$

One of the roots of the quadratic equation (3) is expressed as follows;

$$x = \{(L - 2f - H) + \sqrt{(L - 2f - H)^2 - 4f^2}\}/2 \tag{4}$$

Further, x' is solved by putting the equation (2) into the expression (4) as follows;

$$x' = \{(L - 2f - H) - \sqrt{(L - 2f - H)^2 - 4f^2}\}/2 \tag{5}$$

Also, the following two equations can be obtained from the equation (1).

$$y = y' \cdot x / f \tag{6}$$

$$y = y' \cdot f / x' \tag{7}$$

If the values of x and x' obtained in the expressions (4) and (5) respectively are put into the equations (6) and (7) respectively, the length y of the subject corresponding to the length y' of the subject image can be calculated. Here, it is assumed that the length y' of the image on the image forming plane 200 be the relative length of the unit scale SC. Then, since the length of the unit scale SC is known in advance (equal to the length y' of the subject image on the image forming plane 200,) the relative length of the unit scale SC can be calculated with the use of the equation (6) or (7).

FIGS. 24A, 24B are diagrams showing examples of displaying a scale on the TV monitor 57. FIG. 24A shows an example in which an image magnification $\beta$ itself is displayed. FIG. 24B shows an example in which a unit scale SC is displayed indicating that the dimension of the unit scale SC is equivalent of a length of 10 cm.

The display of a scale on the TV monitor 57 facilitates the comprehension of actual size of the image. Also, the display timing of the unit scale SC can be changed in accordance with a clock pulse from the read out clock pulse generation circuit 59 controlled by the CPU 50. Accordingly, the unit scale SC can be displayed at a desired position on the TV monitor 57. It may be appropriate that the position where the unit scale SC is to be displayed is designated by means of the place designating member 63, e.g., a track ball, to improve the operability. Further, it may be appropriate that the display of the unit scale is easily turned on or off, or that the form of display is changeable from the form shown in FIG. 24A to one shown in FIG. 24B and vice versa.

Moreover, with the use of technique disclosed in Japanese Unexamined Patent Publication 58-158507, a scale can be imprinted on a specified position of a frame of film to indicate the scale even in the case of film.

When the reproduction format C is selected in Step #228, the size of the display screen, e.g., an inch size of the CRT, is inputted by means of the keyboard 62 in Step #229. Subsequently, in Step #230, the image size is changed in accordance with an image magnification $\beta$ calculated from the focal length information f and the subject distance information D and the display screen size information. That is to say, a display magnification which is a ratio of an actual size of the subject to a size of the image displayed on the TV monitor 57 is displayed.

Alternatively, it may be appropriate that the display magnification is fixedly set at a predetermined one regardless of the size of the display screen and the size of a displayed image is changed. In other words, the CPU 50 has display magnification calculation means for calculating the display magnification of a reproduced image based on the image magnification $\beta$ calculated from the focal length information f and the subject distance information D and the display screen size information. By the display magnification calculation means is determined the image size displayed on the TV monitor 57 relative to the actual size of the subject. Also, in the case that a predetermined display magnification is set, ratio of the display magnification calculated by the display magnification calculation means to the predetermined display magnification is calculated. Then, according to the calculated ratio, image processing is performed so as to either enlarge or reduce the image size. The final display magnification is displayed at an appropriate position on the TV monitor 57 according to needs.

The display of the final display magnification on the TV monitor 57 can facilitate the comprehension of the actual size of the subject whose image is displayed on the TV monitor 57.

Next, when the reproduction format D is selected in Step #231, the reproduction routine proceeds to Step #232 in which images to be displayed in a combined manner are selected through the item retrieval routine shown in FIG. 10. Then, desired images are selected out of all the images belonging to the retrieval condition in Step #233. Subsequently, an image data selected first and an image data selected next which are to be displayed with juxtaposed with each other as well as the image magnification information of them are sent to the special reproduction processing unit 52 in which the image data are processed to change the respective image sizes so that a particular subject within one image can have the same size of the identical particular subject within the other image. Then, the processed image data is sent to the frame memory 53 and written therein. Subsequently the images are displayed on the TV monitor 57 in Step #234. Consequently, the identical portions of the juxtaposed images can be displayed at the same magnification on the TV monitor 57.

Alternatively, it may be appropriate that two juxtaposed images are displayed at the same scale to facilitate comparision of actual sizes of subjects within the two images. Further, the operator may enjoy making a photomontage by moving the two images with the use of the place designating member 63, e.g., a track ball in a similar manner as the unit scale display.

In addition, a photographed image and another photographed obtained at a different time can be combined based on the image magnification information of them to make a montage image. For example, a picture in which a human figure is photographed without his/her head on can be reproduced into a new picture in which the human figure is combined with his/her head on.

Next, the reproduction format E is selected in Step #235, image data for display is sent to the special reproduction processing unit 52 in which various kinds of special processing, such as mosaic processing and negativepositive reversal processings, are performed thereto in Step #236. Then, the processed image data is sent to the TV monitor 57.

Next, when the reproduction format F is selected in Step #235, a predetermined number of images, e.g., four images, nine images, are reproduced on the screen (hereinafter referred to as multi-reproduction). The predetermined image number is set in advance, or selected according to needs. Also, a construction may be appropriate which enables the operator to select a desired number of images, such as 2×3 images.

First, in Step #237, frame numbers of images to be multi-reproduced and the number of images are recorded. Then, it is determined whether the number of images has reached a selected predetermined value in Step #238. If the number of images has reached the predetermined value, processing is performed so as to be multi-reproduced in Step #239. Consequently, the reproduction routine proceeds to Step #240. On the other hand, if the number of images has not yet reached the predetermined value, the reproduction routine proceeds to Step #247. Processings performed when the reproduction format F is selected will be described in detail below.

As descrived above, one of the reproduction formats A to F is selected, and then necessary image data is selected and processed in the selected reproduction format, and displayed on the TV monitor 57 in Step #240. Next, in Step #241, it is determined whether the image data has a corresponding voice data. If no such voice data is recorded, the reproduction routine directly proceeds to Step #243. On the other hand, if such voice data is recorded, the voice is reproduced correspondingly to the displayed image in Step #242. Subsequently, it is determined whether the displayed image is to be printed in Step #243. If the operator does not instruct to print the displayed image, the reproduction routine directly proceed to Step #245. On the other hand if the operator instructs to print the displayed image, the displayed image is printed by the printer 71. Then, in Step #245, it is determined whether the displayed image is to be transmitted. If the operator does not instruct to transmit the displayed image, the reproduction routine directly proceeds to Step #247. On the contrary, if the operator instructs to transmit the displayed image, the displayed image is transmitted through the facsimile transmitter machine 72, or the video telephone 73 in Step #246. Upon completion of the print out or transmission of the displayed image, the reproduction routine proceeds to Step #247 in which the number N of images to be sent, set in Step #221, is decremented by one except for the case where the reproduction format F has been selected. Subsequently, in Step #248, it is checked whether the image number N is 0. If the image number N is not 0, the reproduction routine returns to Step #221 where the sequence of Steps #221 to #247 described above is executed until the image number N becomes 0 in Step #248. That is to say, there are no more images to be sent. Subsequently, if the reproduction format F has not been selected, the reproduction routine returns to the retrieval routine of FIG. 9.

On the other hand, if the reproduction format F has been selected, a predetermined number of images are to be reproduced on the screen at the same time, the processing is performed which is different from one performed in the case where one of the reproduction formats A to E is selected. In other words, each time the image data is read out, the image number N is decremented by one until the predetermined number of image data are read out in Step #238. Then, the reproduction routine proceeds to Step #239 in which the image data are processed so that the predetermined number of images are displayed on the screen at the same time. After the predetermined number of images are displayed on the TV monitor 57 in Step #240, these images are either printed or transmitted in the sequence of Step #241 to 246 as described above in units of the predetermined number of images. Subsequently, in Step #247, the image number N is decremented by the predetermined number. The above procedure is repeated until the image number N becomes 0 in Step #248. However, in the reproduction format F, in the case that the image number N is not a multiple of the predetermined number, even when the image number N becomes 0 in Step #248, there is a possibility of remaining another images to be sent. Accordingly, the discrimination is executed in Step #249 whether there remains another images to be sent. If remains the sequence of Steps #240 to #249 is repeated FIG. 25 shows a diagram illustrating a content image displayed on the screen. When the memory card 26 is mounted to the editing/reproduction unit, such contents as "date", "time", "place", "voice recorded ?", and "person's name", are displayed on the TV monitor 57 in chronological order of photography, or in order of image frame. The display of the contents facilitates the selection of display of an image to be reproduced, or the recording of an image in the filing device 61.

FIG. 26 shows a diagram illustrating a retrieval image displayed on the screen when a retrieval condition is designated in the time of information retrieval. The retrieval items include "DATE", "TIME", "PLACE", "SPEAKER", "WEATHER", and "OTHER". In FIG. 26, as an example, specific conditions "summer", "evening time", "Expo '90", and "katsuyuki Nanba" are respectively designated in the spaces of the retrieval items "DATE", "TIME", "PLACE", and "SPEAKER" by means of the keyboard 62. The CPU executes the aforementioned retrieval routine based on the designated retrieval conditions. At a lower portion of the screen is displayed an operation menu showing various available operations so that the operator can designate a desired operation by pointing one of the menu by means of a tablet or a mouse.

FIG. 27 shows a diagram showing a memory map of the memory card 26. The memory map comprises an area for retrieval information, an area for image data, an area for voice on/off data distinguishing whether voice data for each image data is recorded, and an area for voice data. In the area for retrieval information are further written the start address and end address of each data area. Indicated at Vsta and Vend are the start address and end address of the image data area respectively. Indicated at Asta and Aend are the start address and end address of the voice data area respectively. Each data is recorded in the corresponding area therefor in order of the image data, voice data, and retrieval information in accordance with a command signal from the CPU 50.

Next, there will be described execution of the aforementioned information retrieval with the use of inferential mechanism (hereinafter referred to as fuzzy retrieval) with reference to FIGS. 28 to 31.

The fuzzy retrieval is executed based on a membership function. The membership function is prerecorded in grade recording means in corresponding form to each retrieval condition. When a retrieval condition is inputted, the membership function corresponding to the inputted retrieval condition is selected. In accordance with the selected membership function, the information retrieval is started under detailed retrieval items of the highest grade to the lowest one.

Figure 28:
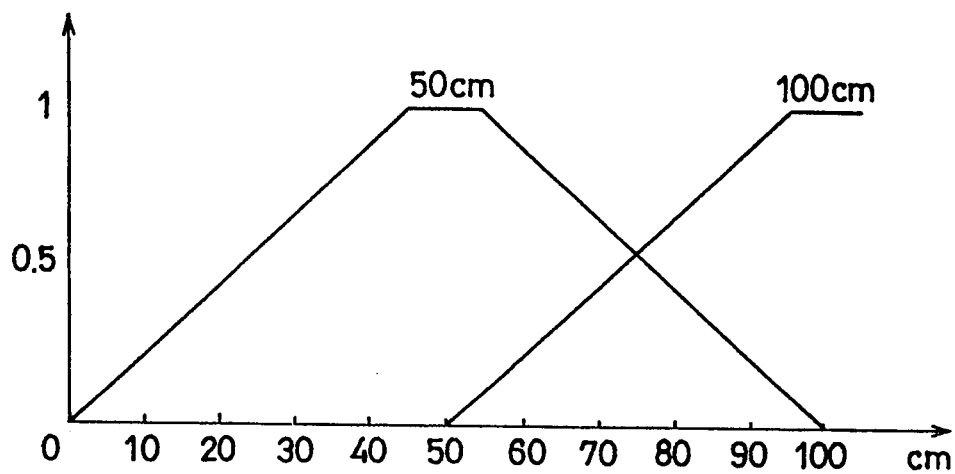
FIG. 28 is a graph showing a membership function in connection with the focal length of the camera.

FIG. 28 shows a membership function used in a case of retrieval based on size information, more specifically, in a case of retriving an image carrying a subject having a size of around 50 cm. In this case, it is assumed that an image carrying a subject having a size of 45 cm to 55 cm have a grade of 1 and that an image carrying a subject having a size of 75 cm or an image carrying a subject having a size of 25 cm have a grade of 0.5. Accordingly, when the retrieval condition "50 cm" is inputted, the recorded image data are given priorities according to their respective grades, i.e., grades of 1, 0.9, 0.8, . . . , calculated based on the membership function. Accordingly, images carrying a subject having a size of 45 to 55 cm are first retrieved and reproduced. Subsequently, images carrying a subject having a size of 44 cm or 56 cm, images carrying a subject having a size of about 40 cm or about 60 cm, and furhter images carrying a subject having a size of about 35 cm or about 65 cm are sequentially retrieved and reproduced in the descending order of grades thereof. Also, when the retrieval condition "100 cm" is inputted, it is assumed that an image carrying a subject having a size of 95 cm to 105 cm has a grade of 1 and that an image carrying a subject having a size of 75 cm has s grade of 0.5. Images are retrieved and reproduced from one having the highest grade to lowest in a similar manner as described above.

Figure 29:
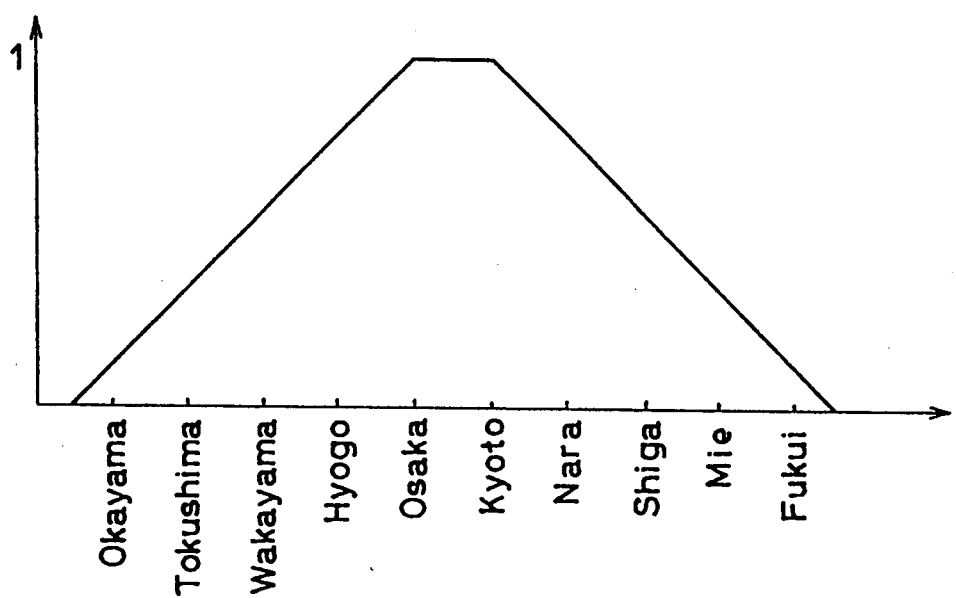
FIG. 29 is a graph showing a membership function in connection with photographing sites.

FIG. 29 shows a membership function used in a case of retrieval based on place information, more specifically, in a case of retriving images photographed in an area of "Kinki" in Japan. In the area of "Kinki", there are the following prefectures: Okayama, Tokushima, Wakayama, Hyogo, Osaka, Kyoto, Nara, Shiga, Mie, and Fukui. As an example, these prefectures can be sorted in order of the number of big cities and famous sight sites included in each prefecture as follows:
1. Osaka and Kyoto;
2. Hyogo and Nara;
3. Wakayama and Shiga;
4. Tokushima and Mie;
5. Okayama and Fukui.

The image data photographed in these places are given priorities in order of the number of big cities and famous sight sites their respective grades, i.e., grades of 1, 0.9, 0.8, . . . , calculated based on the membership function.

When the retrieval condition "Kinki" is inputted, images photographed in Osaka and Kyoto whose grade are 1 are retrieved and reproduced. Subsequently, images photographed in Hyogo and Nara, and images photographed in Wakayama and Shiga, images photographed in Tokushima and Mie, and images photographed in Okayama and Fukui are sequentially retrieved and reproduced in the descending order of grade thereof. Hyogo, Osaka, Kyoto, Nara, Shiga, Mie, and Fukui.

Also, it may be appropriate to allot grades to image data in order of the possibility of doing photography, in order of doing reproduction.

Figure 30:
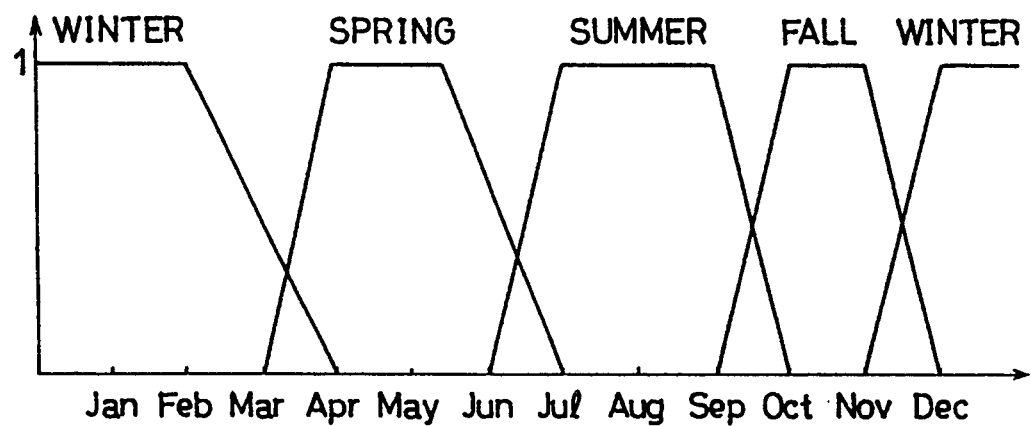
FIG. 30 is a graph showing a membership function in connection with seasons.

FIG. 30 shows membership functions used in a case where seasonal information retrieval is executed, more specifically, in a case of retrieving images based on season. For example, when images photographed in spring are to be reproduced, images photographed in April and May given a grade of 1 are first retrieved and reproduced. Subsequently, images photographed in June are retrieved and reproduced. Also, when images photographed in summer are to be reproduced, images photographed in July, August, and September given a grade of 1 are retrived and reproduced. Subsequently, images photographed in June are retrieved and reproduced. Further, when images photographed in fall are to be reproduced, images photographed in October and November given a grade of 1 are retrived and reproduced. Subsequently, images photographed in September are retrieved and reproduced. Moreover, when images photographed in winter are to be reproduced, images photographed in December, January, and February given a grade of 1 are retrived and reproduced. Subsequently, images photographed in March are retrieved and reproduced.

The seasonal information retrieval is executed by the month in the above example. However, it may be appropriate that the seasonal retrieval is executed by the day. For example, while middle ten days of September may be given a grade of 0.5 for the case that summer is inputted as a retrieval condition, they may be given a grade of 0.5 for the case that fall is inputted as a retrieval condition.

Also, it may be appropriate to execute the seasonal retrieval process in consideration of adding other retrieval conditions, such as temperature, humidity. For instance, when a retrieval condition "summer+hot" is inputted, only image data satisfying the two conditions "summer" and "a temperature of 30° C." are retrieved. In other words, only images photographed in summer under the temperature of not lower than 30° C. are retrieved and reproduced. Similarly, when the retrieval condition "winter+hot" is inputted, only images photographed in winter under a temperature of not lower than 25° C. are retrieved and reproduced.

Figure 31:
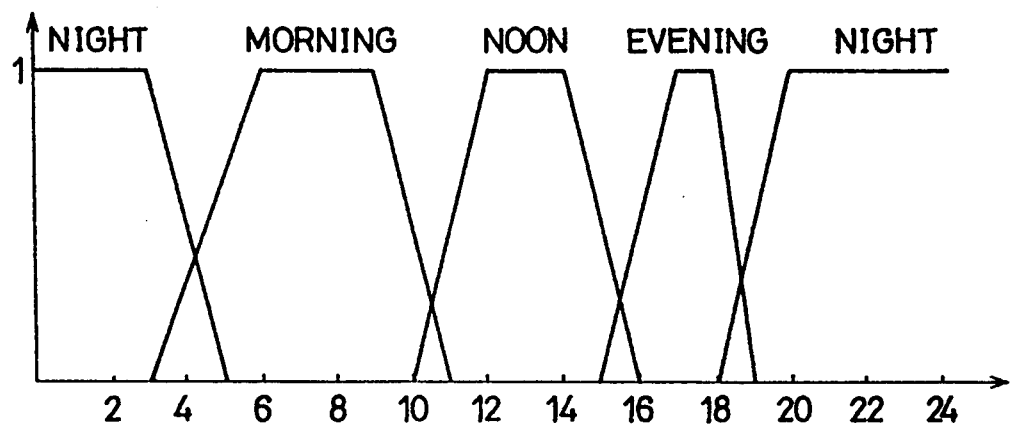
FIG. 31 is a graph showing a membership function in connection with hours.

FIG. 31 shows membership functions used in a case where the time information retrieval is executed, more specifically, in the case where images photographed in each of morning, daytime, evening, and night are to be reproduced.

When "morning" is inputted as a time retrieval condition, images photographed between 6 and 9 in the morning given a grade of 1 are first retrieved and reproduced. Subsequently, images photographed between 5 and 6 in the morning, those photographed between 9 and 10 in the morning, and those photographed between 5 and 4 in the morning are subsequently retrieved and reproduced in the descending order of grades thereof. When "daytime" is inputted as a time retrieval condition, images photographed between noon and 2 in the afternoon given a grade of 1 are first retrieved and reproduced, Subsequently, images photographed between 11 in the morning and noon, and images photographed between 2 and 3 in the afternoon are retrieved and reproduced. When "evening" is inputted as a time retrieval condition, images photographed between 5 and 6 in the afternoon given a grade of 1 are first retrieved and reproduced. Subsequently, images photographed between 4 and 5 in the afternoon are retrieved and reproduced. When "night" is inputted as a time retrieval condition, images photographed between 8 in the afternoon and 3 in the morning given a grade of 1 are first retrieved and reproduced. Subsequently, images photographed between 7 and 8 in the afternoon, and images photographed between 3 and 4 in the morning are retrieved and reproduced. In addition, the time information retreival may be executed in consideration of additing other retrieval conditions, such as temperature, humidity in a similar manner as the case of the seasonal information retrieval.

In addition to the above examples of the fuzzy retrieval, it is possible to retrieve images photographed during mountain climbing with the aid of altitude information from the atmospheric pressure sensor 19 and the GPS signal receiving unit 23. Further, aerial photography information can be automatically obtained by adding the focal length information f and the subject distance information D to the atmospheric pressure information and the altitude information.

Furthermore, the following image discriminations can be executable in the information retrieval.

(1) Male/female discrimination: It is discriminated whether the speaker is male or female in accordance with the difference in tone quality between male voice and female voice by means of voice recognition technique.

(2) Human figure discrimination: It is discriminated who a human figure in the image is by the use of color temperature information of the image from the WB sensor and the pattern recognition.

(3) Grown-up/child discrimination: It is discriminated whether a human figure in the image is a grown-up or child by the use of the image magnification information and the pattern recognition.

(4) Glasses worn discrimination: It is discriminated whether a human figure in the image is wearing glasses by the use of the pattern recognition.

(5) Identical human figure discrimination: It is discriminated whether a human figure in a particular image recorded in advance is identical to a human figure in other images by the use of the pattern recognition and the learning function.

In this embodiment, a digital memory is used as a recording medium. However, an analog memory, such as a floppy disk, may be used as a recording medium. Also, in this embodiment, an editing/reproduction device is provided independently of a camera. However, it may be appropriate that an editing/reproduction device be provided integrally in a camera. Furthermore, it may be appropriate that data obtained by means of each sensor be displayed in the operation/display unit 25, or an independently provided display unit.

Moreover, in this embodiment, an electronic still camera is employed. However, it may be appropriate that each of the sensors described above be provided in a camera using films and that image information from each sensor be imprinted on a specified portion of a frame of a film with the use of known date imprinting technique. In this case, an editing/reproduction device comprises an optical read out unit, a film driving unit, a memory, information retrieval process unit and the like. A film container may be set in the optical read out unit so that photographed images and image information are sequentially read out of the film container as an electric signal by, for example, a CCD included in the optical read out unit and recorded in the memory. Also, it may be advantageous that only photographed images of designated frame be read out of the film container and recorded in the memory. An information retrieval process similar to the one described above is executed by the use of the recorded images and the image information.

Next, another positioning system will be described with reference to FIG. 32 to 37.

Figure 32:
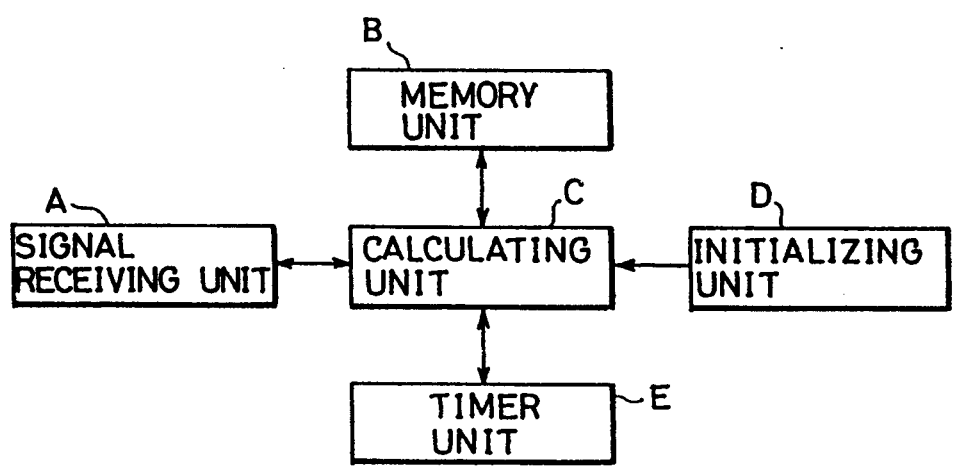
FIG. 32 is a block diagram showing a basic construction of a positioning system to be employed in the present invent ion.

FIG. 32 is a block diagram showing an overall construction of this positioning system. This positioning system is mounted on a camera and includes a positional signal receiving unit A, a memory unit B for storing a positional signal received by the receiving unit at a particular time, a calculating unit for calculating a moved amount of the camera, and an initializing unit D for initializing the calculating unit based on the positional signal stored in the memory unit B. Further, a timer unit E is connected to the calculating unit C. The timer unit E is adapted for generating a clock signal to the calculating unit C to enable the calculating unit C to calculate a moved amount of the camera based on the clock signal, a positional signal received by the receiving unit A, and the positional signal stored in the memory unit B.

The positional signal receiving unit A includes a GPS signal receiver and generates a positional data concerning a present position. To calculate a moved amount from an initial position to a present position, it is necessary to give data concerning the initial position to the calculating unit C. This initializing is accomplished by storing, in the memory unit B, a GPS signal received by the receiving unit A when the initializing unit D is operated. Accordingly, the photographer is not necessary to set the latitude and longitude of the initial position by hand. The photographer is not necessary but to operate the initializing unit D at the initial position.

Thereafter, the calculating unit C calculates a moved amount from the initial position to a present position based on the initial data stored in the memory unit B and a GPS signal received at the present time. If the photographer further moves, the calculating unit C will calculate a new moved amount from the initial position to next position by calculating a moved amount from the present position to the next position, and adding the newly calculated moved amount to the already calculated moved amount.

Also, with the sole use of the timer unit E, or the combination use of the timer E and the initializing unit D, the moved amount from an initial position to a present position can be calculated every a predetermined time of period.

Figure 33:
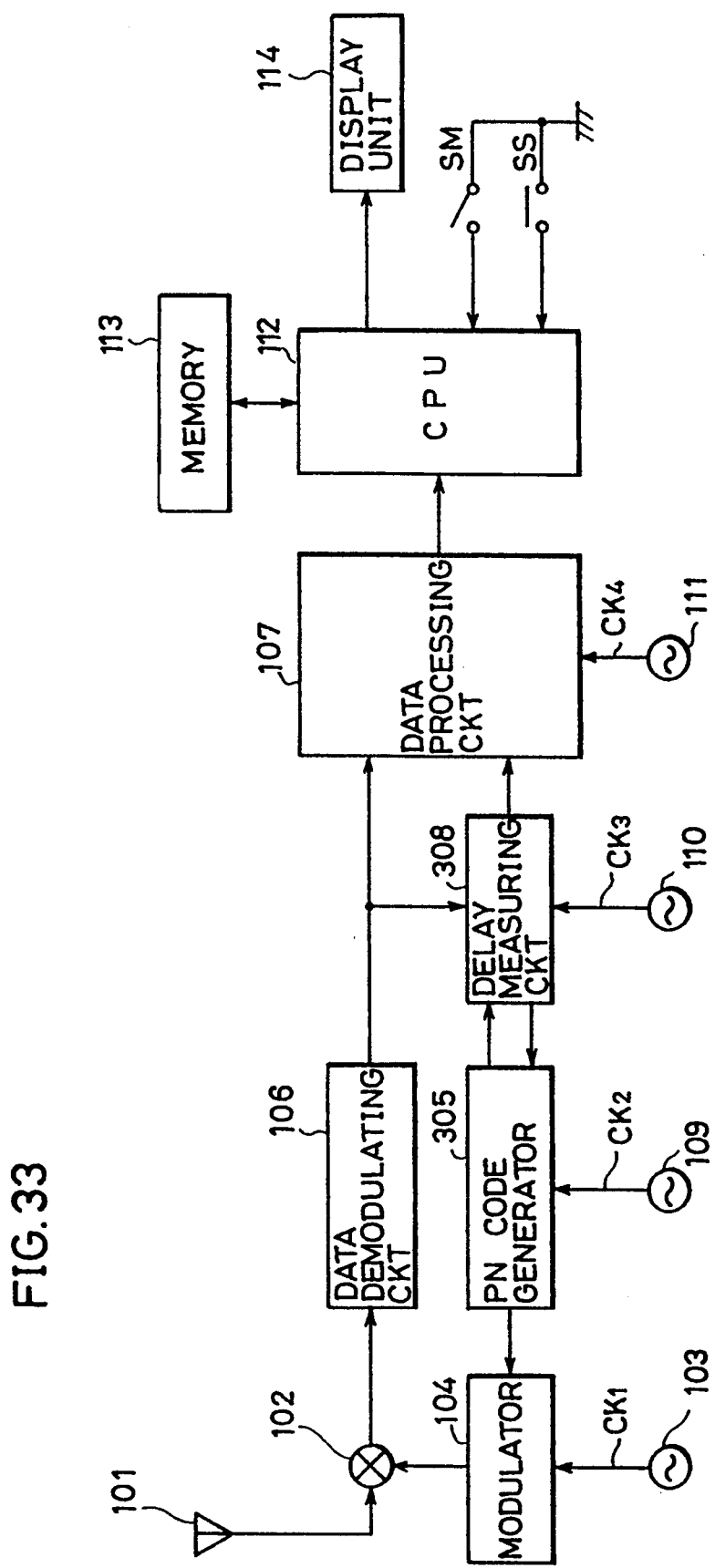
FIG. 33 is a diagram showing a first construction of the positioning system.

FIG. 33 shows a diagram showing a detailed construction of the above-mentioned positioning system. As mentioned above, in this embodiment, a GPS signal is used as the positional signal.

The Global Positioning System is a radio navigation system utilizing a plurality of artficial satellites and capable of collecting three-dimensional positioning information extremely accurately. Each of the satellites radiates microwaves modulated with a pseudo random noise, i.e., PN code. Each satellite uses a different PN code, which enables a GPS signal receiving unit to selectively receive the signal transmitted from a particular satellite by generating a PN code corresponding to the particular satellite and correlating the generated PN code with the PN code from the particular satellite.

A construction of the GPS signal receiving unit will be described with reference to FIG. 33. The GPS signal receiving unit comprises components indicated at numerals 101 to 111. Indicated at 101 is an antenna for receiving a GPS signal from each unillustrated artificial satellite. The GPS signal in the form of a radio frequency (RF) signal is received through the antenna 101 and sent to a mixer 102. On the other hand, a local oscillation signal CK1 generated in a local oscillator 103 is sent to a modulator 104 in which the local oscillation signal CK1 is diffused by a PN code signal outputted from a PN code generator 105, and then sent to the mixer 102. In the mixer 102, the RF signal is converted into an intermediate frequency (IF) signal, and then sent to a data demodulating circuit 106. The data demodulating circuit 106 is adapted for demodulating the IF signal to recover the data including the time when the satellite transmitted the RF signal and other information. The demodulated signal is then sent to a data processing circuit 107 and a delay measuring circuit 108.

Upon receipt of the demodulated signal, the delay measuring circuit 108 sends a timing signal to the PN code generator 105. The PN code generator 105 is adapted for always generating a PN code in accordance with a clock pulse CK2 from a clock generator 109. Upon receipt of the timing signal, the PN code generator 105 sends the PN code generated therein to the delay measuring circuit 108. The delay measuring circuit 108 measures a delay period of the PN code when correlation between the PN code received from the satellite and the PN code from the PN code generator 105 is obtained. The above dalay period is obtained by counting highly stabilized clock pulses CK3 sent from a clock pulse generator 110. The counted value is a time data required for correlating the two PN codes, i.e., a delay period data, which is in turn sent to a data processing circuit 107.

The data processing circuit 107 comprising a microprocesser is driven in accordance with a clock pulse CK4 from a clock pulse generator 111. In the data processing circuit 107, the following processings are performed. Radio propagation time from the satellite to the positioning system is calculated based on the signal transmission time data carried in the demodulated data and the signal reception time. Based on the calculated radio propagation time, the distance between the satellite and the positioning system is calculated. The distance data and the data concerning the position of the satellite itself carried in the demodulated data are obtained for each satellite. Based on the obtained data for each satellite is calculated positional data (latitude, longitude, and altitude,) of the positioning system, and the calculatd information is sent to a CPU 112.

The CPU 112 includes a microcomputer and centrally controls the entire positioning system. Indicated at 113 is a memory adapted for recording the positional data. Indicated at 114 is a display unit adapted for displaying the positional data and the moved amount. Also, indicated at SM is a main switch. Indicated at SS is a positioning start switch for starting the positioning operation and resetting it.

Figure 34:
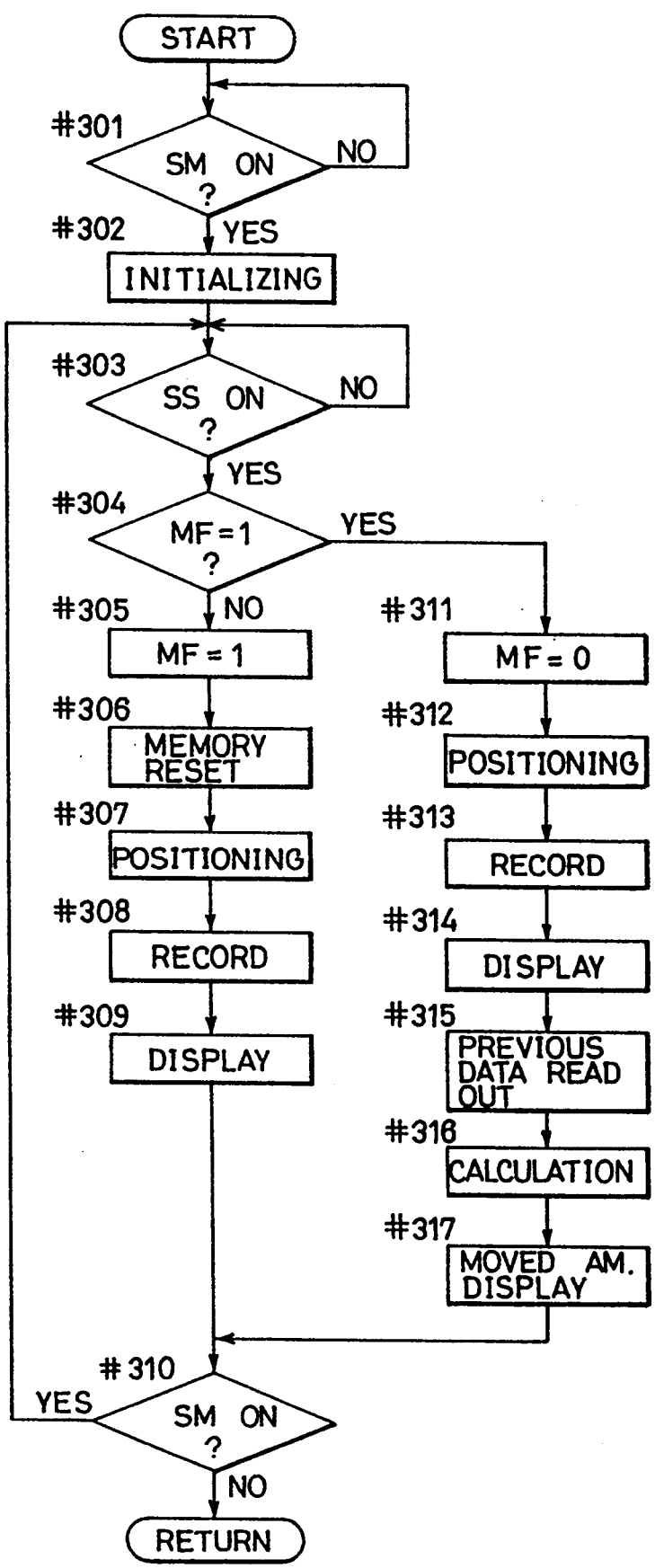
FIG. 34 is a flowchart showing operation of the positioning system of the first construction.

Next, there will be described operation of the positioning system with reference to FIG. 34 showing an operation routine thereof. First, this routine waits until the main switch SM is turned on in Step #301. If the main switch SM is turned on, the flags, memory and the other parts are reset to their respective initial states in Step #302. For example, the flag is reset at 0 and the memory is cleared. Then, this routine proceeds to Step #303 in which it is discriminated whether the positioning start switch SS is turned on. If the positioning start switch SS is not turned on, this routine waits until the switch SS is turned on. On the other hand, if the positioning start switch SS is turned on, this routine proceeds to Step #304 in which it is determined whether a flag MF is set at 1. Since the flag MF is reset at 0 in Step #302, this routine proceeds to Step #305 in the positioning operation. In Step #305, the flag MF is set at 1, and then the memoey 113 is cleared in Step #306. Step #306 is provided to erase previously calculated positional data in the second and subsequent positioning operations. Subsequently, this routine proceeds to Step #307 in which clock pulses are generated in each clock pulse generators and positional data is inputted from the data processing circuit 107 to the CPU 120 in accordance with the generated clock pulses. Next, in Step #308, the inputted positional data is recorded in the memory 113, and the present position is displayed in the display unit 114 in Step #314. Thereafter, it is determined whether the main switch SM is turned on. If the main switch SM is turned off, the positioning operation ends.

On the other hand, if the main switch SM is turned on in Step #310, this routine returns to Step #303 and waits until the switch SS is turned on again. Since the flag MF is set at 1 already in the previous sequence, this routine proceeds through Step #304 to Step #311 in which the flag MF is set at 0. Then, in Step #312, the positioning operation is re-executed and the new positional data is recorded in the memory 113 in Step #313. Subsequently, the new positional data is displayed in the display unit 114 in Step #314. This routine further proceeds to Step #315 in which the previous data (in this case, the first positional data) is read out of the memory 113. Based on the previous positional data and the new positional data is calculated the moved amount of the GPS signal receiving unit in Step #316. Consequently, the moved amount is displayed in the display unit 114, and this routine returns to Step #310.

As described above, in this positioning system, the positioning start switch SS is actuated so as to set the present position as an initial position, making it possible to display how far the positioning system has moved from the initial position.

Figure 35:
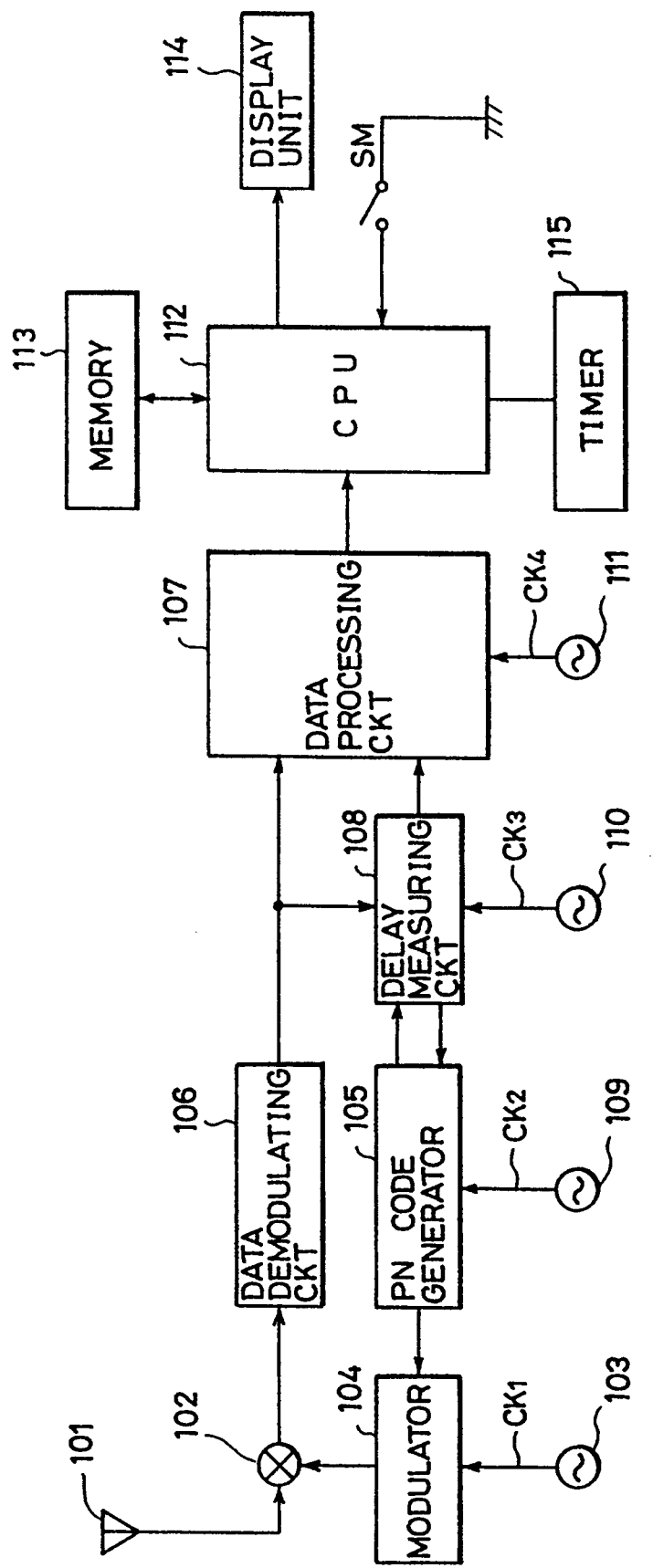
FIG. 35 is a diagram showing a second construction of the positioning system.

FIG. 35 is a block diagram showing another positioning system having a timer 115 instead of the positioning start switch SS of the positioning system of FIG. 33. Like numerals are designated to like parts of the positioning system of FIG. 33.

Figure 36:
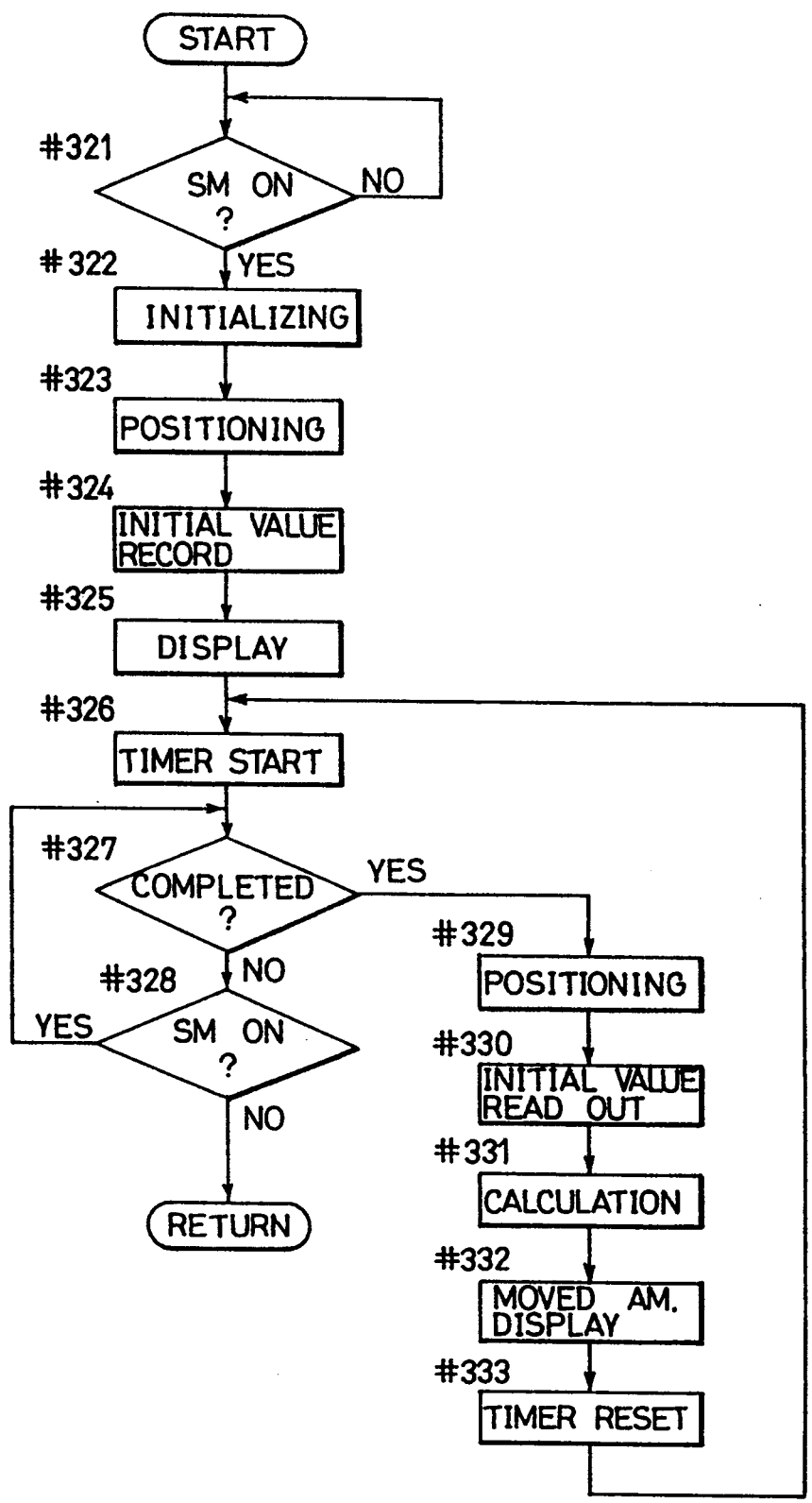
FIG. 36 is a flowchart showing operation of the positioning system of the second construction.

Operation of the positioning system of FIG. 35 will be described with reference to FIG. 36 showing an operation routine thereof. This operation routine waits until the main switch SM is turned on in Step #321. Then, in Step #322, the timer 115 and the memory 113 are reset at their respective initial states. Subsequently, the positioning operation is executed in a similar manner as described in the positioning system of FIG. 33 in Step #324, and initial positional data which is the position of the GPS signal receiving unit when the main switch SM is turned on, is recorded in the memory 113. This operation routine further proceeds to Step #325 in which the initial positional data is displayed in the display unit 114 and then to Step #326 in which the timer 115 is started. The timer 115 may be preset at a predetermined value, or may be set at a desired value by the operator. Then, this routine proceeds to Step #327 in which it is determined whether countdown of the timer 115 has been completed. If the countdown of the timer 115 has not been completed yet, this routine proceeds to Step #328 in which it is determined whether the main switch SM is turned on. If the main switch SM is not turned on, this routine ends. If, instead, the switch SM is turned on, this routine returns to Step #327.

On the other hand, if the countdown of the timer 115 has already been completed, this routine proceeds to step #329 in which the positioning operation is re-executed to detect the present position. Then, in Step #330, the initial positional data is read out of the memory 113, and the moved amount is calculated based on the present and the initial positional data in Step #331. Subsequently, this routine proceeds to Step #332 in which the calculation result is displayed in the display unit 114 and then proceeds to Step #333 in which the timer 115 is reset. Thereafter, this routine returns to Step #326 in which the timer 115 is restarted.

As described above, it is made possible in this positioning system to detect how far the positioning system has moved at regular periods of time. Further, the moved speed can be obtained by dividing the moved distance, which is a distance between the initial position and the present position, by a used time.

Figure 37:
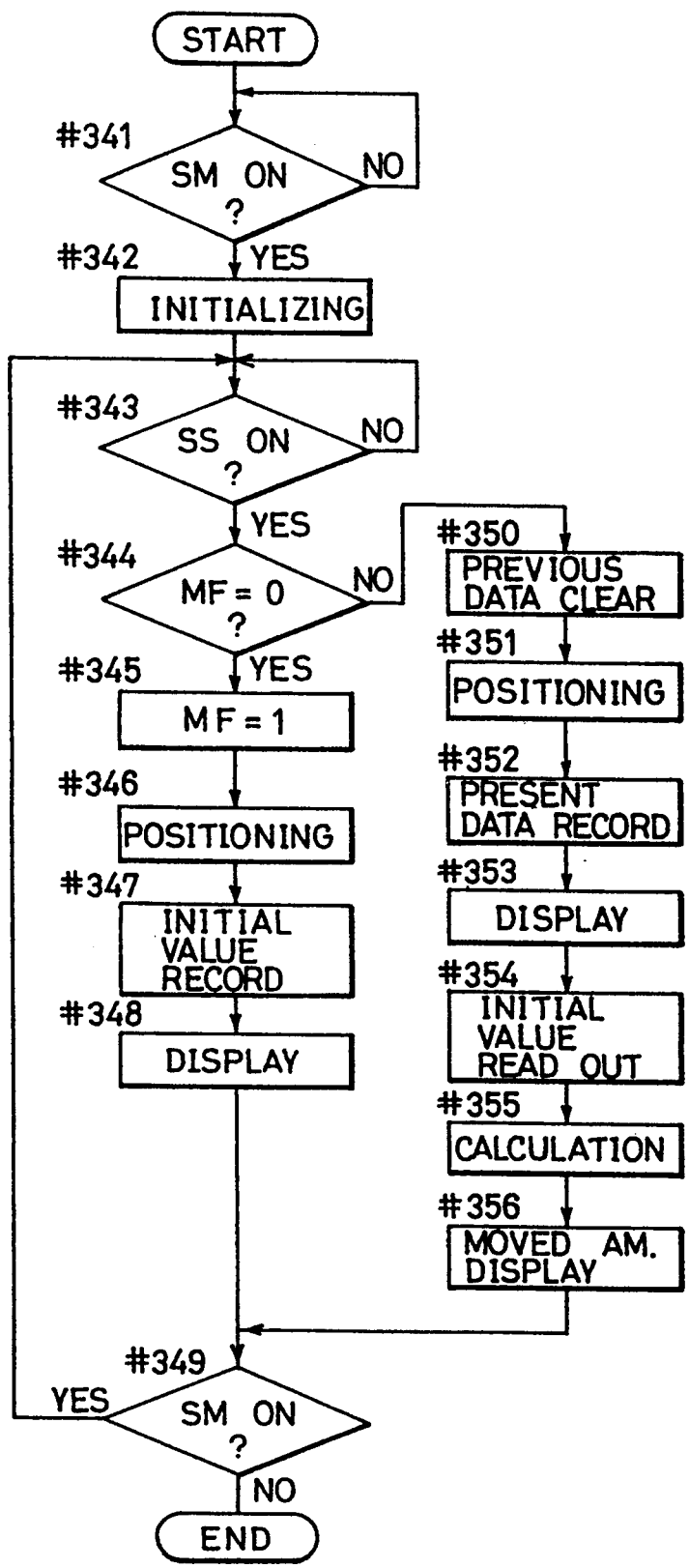
FIG. 37 is a flowchart showing another operation of the positioning system of the second construction.

FIG. 37 is a flow chart showing another operation routine of the positioning system of FIG. 35. In this operation routine, the positional data at an arbitral position and the moved amount from the initial position can be displayed. A sequence of Steps #341 to #343 in FIG. 37 is identical to the sequence of Steps #301 to #303 in FIG. 34. In Step #344, it is determined whether the flag MF is set at 0. In the case of initially executing the positioning operation, since the flag MF is already set at 0 in Step #342, this routine proceeds to Step #345 in which the flag MF is set at 1. Then, in Step #346, the positioning operation is executed, and the obtained positional data is recorded in the memory 113 in Step #347. After the positional data being displayed in the display unit 114 this routine proceeds to Step #349 in which it is determined whether the main switch SM is turned on. If the main switch SM is turned on, this routine returns to Step #343. On the contrary, if the main switch SM is not turned on, this routine ends.

In the case of the second and subsequent positioning operations, on the other hand, since the flag MF is already set at 0, this routine proceeds to Step #350. In Step #350, the previous positional data is cleared. However, the initial positional data is not cleared. Subsequently, this routine proceeds to Step #351 in which the present position is detected. The detected present positional data is recorded in the memory 113 in Step #352, and displayed in the display unit 114 in Step #353. Thereafter, the initial positional data is read out of the memory 113 in Step #354, and the moved amount from the inital position to the present position is calculated based on the initial positional data and the present positional data in Step #355. The calculated moved amount is displayed in the display unit 114 in Step #356, and then this routine returns to Step #349.

As described above, in this operation routine, the moved distance from the initial position is calculated at an arbitrary position. In the operation routine of FIG. 34, the moved distance between two arbitrary positions is calculated. On the contrary, the integral moved distance from the initial position to the present position is calculated in the operation routine of FIG. 37.

In the above positioning systems, a GPS signal is used to detect the present position. However, it may also be appropriate to receive positional signals from another radio navigation system transmitter stations. Also, the positioning system of FIG. 33 and the positioning system of FIG. 35 may be combined so that the reset switch and the timer can be used together. Further, in the positioning system of FIG. 35 where the timer is used, it may be appropriate to display the moved distance during each period of time. Moreover, a positioning start switch can be used as a photography start switch. Each time the photography is practiced, the moved amount is written in the film, or recorded in a memory card or the like together with the image data as an image information.

Also, it will be seen that these positioning systems can be used to detect the distance from a position to another position.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A photographic system comprising: a camera including;

photographing means for photographing subjects to generate respective image data of the subjects, first storage means for storing the generated image data, information production means for producing, at the time of photography, information pertaining to the photographed subjects and identifying the respective image data stored by said first storage means, and second storage means for storing the produced information; and a reproduction device for reproducing the image data including;

retrieval condition input means for inputting a retrieval condition designating stored produced information for retrieving desired stored image data, retrieval means responsive to the retrieval condition input means for retrieving the stored image data identified by the stored produced information designated by the input retrieval condition, and reproducing means for reproducing the retrieved stored image data.

2. A photographic system according to claim 1 wherein the information production means includes a microphone for receiving a voice in connection with a subject and for generating a voice signal, and a voice signal processing circuit for processing the generated voice signal to produce voice information concerning the voice of the subject as said produced information.

3. A photographic system according to claim 2 wherein the retrieval means includes memory means for storing a relationship between respective characteristic voices of persons and respective names of the persons, and finding means responsive to the retrieval condition input means for finding the image data having the voice information corresponding to a person's name inputted as the retrieval condition by the retrieval condition input means by correlating the voice information to the relationship stored in the memory means.

4. A photographic system according to claim 3 wherein the voice information and the person's name are encoded to correlate to each other.

5. A photographic system according to claim 1 wherein the information production means includes measuring means for measuring the distance to a subject and for generating a distance signal, and a distance signal processing circuit for processing the distance signal to produce distance information concerning the distance to the subject as said produced information.

6. A photographic system according to claim 1 wherein the information production means produces a plurality of kinds of information, respectively, in connection with a plurality of photographed subjects different from one another.

7. A photographic system comprising: a camera including;

photographing means for photographing subjects to generate respective image data of the subjects, first storage means for storing the generated image data, information production means for producing, at the time of photography, information depending on a state of the camera in which each of the subjects is photographed and identifying the respective image data stored by said first storage means, and second storage means for storing the produced information; and a reproduction device for reproducing the image data including;

retrieval condition input means for inputting a retrieval condition designating stored produced information for retrieving desired stored image data;

retrieval means responsive to the retrieval condition input means for retrieving the stored image data identified by the stored produced information designated by the input retrieval condition, and reproducing means for reproducing the retrieved stored image data.

8. A photographic system according to claim 6 wherein the photographing means includes a photographic lens, the information production means includes focal length detection means for detecting a focal length of the photographic lens in which each of the subjects is photographed and for generating a focal length signal, and a signal processing circuit for processing the generated focal length signal to produce focal length information of photographing the subjects as said produced information.

9. A photographic system according to claim 7 wherein the information production means produces a plurality of kinds of information, respectively, in connection with a plurality of camera states different from one another.

10. A photographic system comprising: a camera including;

photographing means for photographing subjects to generate respective image data of the subjects, first storage means for storing the generated image data, information production means for producing, at the time of photography, information depending on a photographing state of photographing each of the subjects and identifying the respective image data stored by said first storage means, and second storage means for storing the produced information; and a reproduction device for reproducing the image data including;

retrieval condition input means for inputting a retrieval condition designating stored produced information for retrieving desired stored image data, retrieval means responsive to the retrieval condition input means for retrieving the stored image data identified by the stored produced information designated by the input retrieval condition, and reproducing means for reproducing the retrieved stored image data.

11. A photographic system according to claim 10 wherein the photographing means includes a photographic lens, the information production means includes measuring means for measuring distance to a subject and for generating a distance signal, focal length detection means for detecting a focal length of the photographic lens in which each of the subjects is photographed and for generating a focal length signal, and a signal processing circuit for processing the generated distance signal and the generated focal length signal to produce distance information concerning the distance to the subject and focal length information of photographing the subjects as said produced information.

12. A photographic system according to claim 11 wherein the retrieval means includes calculating means for calculating an image magnification based on the distance information and the local length information, and discriminating means, based on the calculated image magnification, for discriminating between a human figure subject and a landscape subject.

13. A photographic system according to claim 10 wherein the information production means produces a plurality of kinds of information, respectively, in connection with a plurality of photographing states different from one another.

14. A photographic system comprising: a camera including;
   photographing means for photographing subjects to generate respective image data of the subjects,
   first storage means for storing the generated image data,
   information production means for producing, at the time of photography, information depending on a condition where the photographing is carried out for each of the subjects and identifying the respective image data stored by said first storage means, and
   second storage means for storing the produced information; and
   a reproduction device for reproducing the image data including;
   retrieval condition input means for inputting a retrieval condition designating stored produced information for retrieving desired stored image data,
   retrieval means responsive to the retrieval condition input means for retrieving the stored image data identified by the stored produced information designated by the input retrieval condition, and
   reproducing means for reproducing the retrieved stored image data.

15. A photographic system according to claim 14 wherein the information production means includes weather condition detection means for detecting a weather condition under which each of the subjects is photographed and for generating a weather condition signal, and a signal processing circuit for processing the weather condition signal to produce weather condition information as said produced information.

16. A photographic system according to claim 15 wherein the weather condition detection means includes a temperature sensor for detecting a temperature at which each of the subjects is photographed for generating the weather condition signal.

17. A photographic system according to claim 15 wherein the weather condition detection means includes a humidity sensor for detecting a humidity at which each of the subjects is photographed for generating the weather condition signal.

18. A photographic system according to claim 15 wherein the weather condition detection means includes an atmospheric pressure sensor for detecting atmospheric pressure at which each of the subjects is photographed for generating the weather condition signal.

19. A photographic system according to claim 15 wherein the weather condition detection means includes a temperature sensor for detecting a temperature at which each of the subjects is photographed for generating a temperature signal, and a humidity sensor for detecting a humidity at which each of the subjects is photographed for generating a humidity signal; and
   the signal processing circuit includes memory means for storing a relationship between weather conditions and temperatures and humidities, and weather condition information determination means for determining weather condition information based on the relationship stored in the memory.

20. A photographic system according to claim 14 wherein the information production means includes a timer for providing a date when each of the subjects is photographed and for generating a date signal, and a signal processing circuit for processing the generated date signal to produce date information as said produced information.

21. A photographic system according to claim 20 wherein the retrieval means includes memory means for storing a relationship between seasons and dates, and finding means responsive to the retrieval condition input means for finding the image data having the date information corresponding to a season inputted as the retrieval condition by the retrieval condition input means by correlating the time information to the relationship stored in the memory means.

22. A photographic system according to claim 14 wherein the information production means includes color temperature detection means for detecting a color temperature of a subject when each of the subjects is photographed and for generating a color temperature signal, and a signal processing circuit for processing the generated color temperature signal to produce color temperature information as said produced information.

23. A photographic system according to claim 22 wherein the retrieval means includes discriminating means for discriminating whether the subject is photographed indoors or outdoors.

24. A photographic system according to claim 22 wherein the retrieval means includes memory means for storing a relationship between color temperatures of natural light and other light, and discriminating means for discriminating whether the subject is photographed under natural light or other light.

25. A photographic system according to claim 14 wherein the information production means produces a plurality of kinds of information, respectively, in connection with a plurality of photographing conditions different from one another.

26. A photographic system comprising: a photographic device for photographing subjects to generate respective image data of the subjects, the photographing device including information production means for producing, at the time of photography, information depending on a state of photographing each of the subjects and identifying the respective image data stored by said first storage means, and storage means for storing the produced information; and
   a reproduction device for reproducing the image data, the reproduction device including retrieval condition input means for inputting a retrieval condition designating stored produced information for retrieving desired image data, retrieval means responsive to the retrieval condition input means for retrieving the image data identified by the stored produced information designated by the input retrieval condition, and reproducing means for reproducing the retrieved image data.

27. A photographic system according to claim 26 wherein the information production means includes a timer for providing a date when each of the subjects is photographed and for generating a date signal, and a signal processing circuit for processing the date signal to produce date information as said produced information.

28. A photographic system according to claim 27 wherein the retrieval means includes memory means for storing a relationship between seasons and dates, and finding means responsive to the retrieval condition input means for finding the image data having the date information corresponding to a season inputted as the retrieval condition by the retrieval condition input means by correlating the time information to the relationship stored in the memory means.

29. A photographic system according to claim 28 wherein the relationship between seasons and dates is defined by a membership function.

30. A photographic system according to claim 22 wherein the information production means includes a device for specifying a place where each of the subjects is photographed and for generating a place signal, and a signal processing circuit for processing the place signal to produce place information as said produced information.

31. A photographic system according to claim 30 wherein the retrieval means includes memory means for storing a relationship between areas and places, an area including a number of places, and finding means responsive to the retrieval condition input means for finding the image data having the place information corresponding to an area inputted as the retrieval condition by the retrieval condition input means by correlating the place information to the relationship stored in the memory means.

32. A photographic system according to claim 31 wherein the relationship between areas and places is defined by a membership function.

33. A photographic system according to claim 22 wherein the information production means includes;
- a temperature sensor for detecting a temperature when each of the subjects is photographed and for generating a temperature signal,
- a humidity sensor for detecting a humidity when each of the subjects is photographed and for generating a humidity signal, and
- a signal processing circuit for processing the temperature signal and the humidity signal to produce temperature information and humidity information as said produced information; and the retrieval means includes:
- memory means for storing a relationship between weather conditions and temperatures and humidities, and finding means responsive to the retrieval condition input means for finding the image data having the temperature information and the humidity information corresponding to a weather condition inputted as the retrieval condition by the retrieval condition input means by correlating the temperature information and the humidity information to the relationship stored in the memory means.

34. A photographic system according to claim 26 wherein the information production means includes;
- a temperature sensor for detecting a temperature at which each of the subjects is photographed and for generating a temperature signal, and
- a signal processing circuit for processing the temperature signal to produce temperature information as said produced information; and the retrieval means includes:
- memory means for storing a relationship between weather conditions and temperatures, and finding means responsive to the retrieval condition input means for finding the image data having the temperature information corresponding to a weather condition inputted as the retrieval condition by the retrieval condition input means by correlating the temperature information to the relationship stored in the memory means.

35. A photographic system according to claim 26 wherein the image information production means includes;
- a timer for providing an hour when each of the subjects is photographed and for generating an hour signal, and
- a signal processing circuit for processing the generated hour signal to produce hour information as said produced image information; and the retrieval means includes:
- memory mans for storing a relationship between time periods and hours, and finding means responsive to the retrieval condition input means for finding the image data having the hour information corresponding to a time period inputted as the retrieval condition by the retrieval condition input means by correlating the hour information to the relationship stored in the memory means.

36. A photographic system according to claim 26 wherein the information production means produces a plurality of kinds of information, respectively, in connection with a plurality of photographing states different from one another.

37. A photographic system comprising:
- a camera including;
- photographic means for photographing subjects to generate respective image data of the subjects.
- information production means for producing, at the time of photography, information depending on a state of photographing each of the subjects and identifying the respective image data stored by said first storage means, and
- a storage medium for storing the image data and the produced information; and
- a reproduction device including;
- means for reading and storing the image data and the produced information from the storage medium, and for using the produced information to retrieve desired respective image data.

38. A photographic system according to claim 37 wherein the information production means produces a plurality of kinds of information, respectively, in connection with a plurality of photographing states different from one another.

* * * * *

UNITED STATES PATENT AND TRADEMARK OFFICE
CERTIFICATE OF CORRECTION

PATENT NO. : 5,335,072

DATED : August 2, 1994

INVENTOR(S) : Yoshito Tanaka, et al.

It is certified that error appears in the above-indentified patent and that said Letters Patent is hereby corrected as shown below:

In Col. 6, line 2, change "botton" to --button--.

In Col. 6, line 3, change "$S_z$" to --$S_2$--.

In Col. 6, line 67, after "generating", insert --circuit--.

In Col. 12, line 20, change "thr" to --the--.

In Col. 16, line 47, change "sinsor" to --sensor--.

In Col. 19, line 3, change "comletion" to --completion--.

In Col. 21, line 38, before "obtained", insert --image--.

In Col. 24, line 4, change "furhter" to --further--.

In Col. 24, line 11, change "S" to --a--.

UNITED STATES PATENT AND TRADEMARK OFFICE
CERTIFICATE OF CORRECTION

PATENT NO. : 5,335,072
DATED : August 2, 1994
INVENTOR(S) : Yoshito Tanaka, et al.

It is certified that error appears in the above-indentified patent and that said Letters Patent is hereby corrected as shown below:

In Col. 24, line 16, change "retriving" to --retrieving--.

In Col. 25, line 52, change "additing" to --adding--.

In Col. 28, line 25, change "calculatd" to --calculated--.

In Col. 28, line 51, change "memoey" to --memory--.

In Col. 29, last line, change "arbitral" to --arbitrary--.

In Col. 35, line 13 (claim 30, line 1), change "22" to --26--.

In Col. 35, line 33 (claim 33, line 1), change "22" to --26--.

Signed and Sealed this

Twenty-fifth Day of April, 1995

Attest:

BRUCE LEHMAN

Attesting Officer                Commissioner of Patents and Trademarks